United States Patent
Miao et al.

(10) Patent No.: US 12,442,804 B2
(45) Date of Patent: Oct. 14, 2025

(54) NOBLE METAL DECORATED ORDERED METAL OXIDE NANOSTRUCTURE THIN FILMS

(71) Applicants: Jiansong Miao, Tempe, AZ (US); Jerry Lin, Scottsdale, AZ (US)

(72) Inventors: Jiansong Miao, Tempe, AZ (US); Jerry Lin, Scottsdale, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 682 days.

(21) Appl. No.: 17/489,639

(22) Filed: Sep. 29, 2021

(65) Prior Publication Data

US 2022/0099643 A1  Mar. 31, 2022

Related U.S. Application Data

(60) Provisional application No. 63/084,885, filed on Sep. 29, 2020.

(51) Int. Cl.
| | |
|---|---|
| G01N 33/00 | (2006.01) |
| B82Y 40/00 | (2011.01) |
| G01N 27/12 | (2006.01) |
| B01J 23/52 | (2006.01) |

(52) U.S. Cl.
CPC .......... *G01N 33/0031* (2013.01); *B82Y 40/00* (2013.01); *G01N 27/127* (2013.01); *B01J 23/52* (2013.01)

(58) Field of Classification Search
None
See application file for complete search history.

(56) References Cited

U.S. PATENT DOCUMENTS

| | | |
|---|---|---|
| 9,393,590 B2 | 7/2016 | Neretina et al. |
| 11,716,867 B1 * | 8/2023 | Weimer ................ C09K 11/06 |

(Continued)

FOREIGN PATENT DOCUMENTS

| | | |
|---|---|---|
| EP | 1652206 | 5/2006 |
| KR | 20140000468 A * | 1/2014 |

(Continued)

OTHER PUBLICATIONS

Zasadzinski et al., "Langmuir-Blodgett Films," Science, vol. 263, Mar. 25. (Year: 1994).*

(Continued)

*Primary Examiner* — David Sample
(74) *Attorney, Agent, or Firm* — Fish & Richardson P.C.

(57) ABSTRACT

A sensing film configured to detect an analyte gas includes a metal oxide thin film and noble metal nanoparticles disposed on the metal oxide thin film. The sensing film can be a compressed thin film of metal oxide nanostructures. Forming the sensing film includes dispersing the multiplicity of hydrophobic metal oxide nanostructures onto a surface of a layer of water to yield a thin film of the hydrophobic metal oxide nanostructures on the water. The hydrophobic metal oxide nanostructures have a common orientation with respect to the surface of the water. The thin film of the hydrophobic metal oxide nanostructures are compressed to yield a compressed thin film of the hydrophobic metal oxide nanostructures.

13 Claims, 30 Drawing Sheets

(56) References Cited

U.S. PATENT DOCUMENTS

| | | | |
|---|---|---|---|
| 2006/0023209 A1* | 2/2006 | Lee | G01N 21/658 |
| | | | 356/301 |
| 2009/0136754 A1* | 5/2009 | Rao | C03C 17/42 |
| | | | 428/375 |
| 2009/0312954 A1 | 12/2009 | Utriainen | |
| 2010/0325073 A1* | 12/2010 | Haick | B82Y 15/00 |
| | | | 257/253 |
| 2012/0097917 A1* | 4/2012 | Zhou | G01N 27/127 |
| | | | 977/773 |
| 2012/0141429 A1* | 6/2012 | Hass | B82Y 5/00 |
| | | | 435/375 |
| 2014/0087138 A1* | 3/2014 | Bae | C30B 11/12 |
| | | | 427/124 |
| 2021/0285089 A1* | 9/2021 | Xiao | C23C 14/34 |
| 2022/0379270 A1 | 12/2022 | Lin et al. | |

FOREIGN PATENT DOCUMENTS

| | | |
|---|---|---|
| WO | WO 2005/059952 | 6/2005 |
| WO | WO 2021/247736 | 12/2021 |
| WO | WO 2022/246395 | 11/2022 |
| WO | WO 2022/246423 | 11/2022 |

OTHER PUBLICATIONS

Alizadeh et al., Breath Acetone Sensors as Non-Invasive Health Monitoring Systems: A Review. IEEE Sensors Journal, 2020, 20(1):5-31.

Altomare et al., Templated Dewetting: Designing Entirely Self-Organized Platforms for Photocatalysis. Chemical Science 2016, 7 (12), 6865-6886.

Azizi et al., Formation of Polymer-Grade Ethylene by Selective Hydrogenation of Acetylene over Au/CeO2 Catalyst. Journal of Catalysis 2008, 256 (2), 338-344.

Azizi et al., Role of Support in the Oxidation of Acetylene over Gold Catalysts. Journal of Catalysis 2010, 269 (1), 26-32.

Barsan et al., Conduction Model of Metal Oxide Gas Sensors. Journal of Electroceramics 2001, 7 (3), 143-167.

Behera et al., An Innovative Gas Sensor Incorporating ZnO—CuO Nanoflakes in Planar MEMS Technology. Sensors and Actuators B: Chemical 2016, 229, 414-424.

Bhati et al., Efficient Hydrogen Sensor Based on Ni-Doped ZnO Nanostructures by RF Sputtering. Sensors and Actuators B: Chemical 2018, 255, 588-597.

Bonasewicz et al., Influence of Surface Processes on Electrical, Photochemical, and Thermodynamical Properties of Zinc Oxide Films, J. Electrochem. Soc. (1985) 133:2270-2278.

Burnett et al., Mechanism of acetylene oxidation on the Pt(111) surface using in situ fluorescence yield near-edge spectroscopy. Journal of Catalysis 230 (2005) 282-290.

Campbell et al., Anchored Metal Nanoparticles: Effects of Support and Size on Their Energy, Sintering Resistance and Reactivity. Faraday Discussions 2013, 162, 9-30.

Castagna et al., A High Stability and Uniformity W Micro Hot Plate. Sensors and Actuators A: Physical 2018, 279, 617-623.

Cheng et al., Large-Area Alignment of Tungsten Oxide Nanowires over Flat and Patterned Substrates for Room-Temperature Gas Sensing. Angewandte Chemie International Edition 2015, 54 (1), 340-344.

Choi et al., Ultrasensitive Detection of VOCs Using a High-Resolution CuO/Cu2O/Ag Nanopattern Sensor. Advanced Functional Materials 2019, 29 (9), 1808319. 9 pages.

Chung et al., Nanoislands as Plasmonic Materials. Nanoscale 2019, 11 (18), 8651-8664.

Courbat et al., Drop-coated metal-oxide gas sensor on polyimide foil with reduced power consumption for wireless applications. Sensors and Actuators B 161 (2012) 862-868.

Das et al., Simultaneous Adsorption-Desorption Processes in the Conductance Transient of Anatase Titania for Sensing Ethanol: A Distinctive Feature with Kinetic Perception, J. Phys. Chem. C. 121 (2017) 1146-1152.

Du et al., Thickness Dependence of Sensor Response for CO Gas Sensing by Tin Oxide Films Grown Using Atomic Layer Deposition. Sensors and Actuators B: Chemical 2008, 135 (1), 152-160.

Duriyasart et al., Sintering-Resistant Metal Catalysts Supported on Concave-Convex Surface of TiO2 Nanoparticle Assemblies. ChemCatChem 2018, 10 (16), 3392-3396.

Elmi et al., Development of Ultra-Low-Power Consumption MOX Sensors with Ppb-Level VOC Detection Capabilities for Emerging Applications. Sensors and Actuators B: Chemical 2008, 135 (1), 342-351.

Feng et al., Stabilization of Noble Metal Nanostructures for Catalysis and Sensing. Nanoscale 2018, 10 (44), 20492-20504.

Gabelnick et al., Propylene Oxidation Mechanisms and Intermediates Using in Situ Soft X-ray Fluorescence Methods on the Pt(111) Surface. J. Am. Chem. Soc. 2000, 122, 143-149.

Goodman et al., Mechanistic Understanding and the Rational Design of Sinter-Resistant Heterogeneous Catalysts. ACS Catal. 2017, 7 (10), 7156-7173.

Hagedorn et al., Catalytically Doped Semiconductors for Chemical Gas Sensing: Aerogel-Like Aluminum-Containing Zinc Oxide Materials Prepared in the Gas Phase. Advanced Functional Materials 2016, 26 (20), 3424-3437.

Han et al., Pure and Sn-, Ga-and Mn-doped ZnO gas sensors working at different temperatures for formaldehyde, humidity, NH3, toluene and CO, Appl. Phys. A Mater. Sci. Process. 104 (2011) 627-633.

Hansen et al., Sintering of Catalytic Nanoparticles: Particle Migration or Ostwald Ripening? Acc. Chem. Res. 2013, 46 (8), 1720-1730.

Hu et al., Adsorption kinetics of optochemical NH3 gas sensing with semiconductor polyaniline films, Sensors Actuators, B Chem. 82 (2002) 14-23.

Hu et al., Metal-Support Interaction Controlled Migration and Coalescence of Supported Particles. Sci. China Technol. Sci. 2019, 62 (5), 762-772.

Hua et al., A Theoretical Investigation of the Power-Law Response of Metal Oxide Semiconductor Gas Sensors I: Schottky Barrier Control. Sensors and Actuators B: Chemical 2018, 255, 1911-1919.

Hua et al., A Theoretical Investigation of the Power-Law Response of Metal Oxide Semiconductor Gas Sensors II: Size and Shape Effects. Sensors and Actuators B: Chemical 2018, 255, 3541-3549.

Hübner et al., An Au Clusters Related Spill-over Sensitization Mechanism in SnO 2—Based Gas Sensors Identified by Operando HERFD-XAS, Work Function Changes, DC Resistance and Catalytic Conversion Studies. Physical Chemistry Chemical Physics 2012, 14 (38), 13249-13254.

Huo et al., Preparation, Structure, and Properties of Three-Dimensional Ordered α-Fe2O3 Nanoparticulate Film. Chem. Mater. 2000, 12 (3), 790-794.

Jia et al., Selective Hydrogenation of Acetylene over Au/Al 2 O 3 Catalyst. J. Phys. Chem. B 2000, 104 (47), 11153-11156.

Jin et al., Characterization of Reduced Graphene Oxide (rGO)-Loaded SnO2 Nanocomposite and Applications in C2H2 Gas Detection. Applied Sciences 2017, 7 (1), 15 pages.

Kanda et al., Development of a WO3 thick-film-based sensor for the detection of VOC. Sensors and Actuators B 108 (2005) 97-101.

Kaneti et al., Crystal Plane-Dependent Gas-Sensing Properties of Zinc Oxide Nanostructures: Experimental and Theoretical Studies. Phys. Chem. Chem. Phys. 2014, 16 (23), 11471-11480.

Kim et al., Dual-mode gas sensor for ultrasensitive and highly selective detection of xylene and toluene using Nb-doped NiO hollow spheres, Sensors Actuators, B Chem. 301 (2019) 127140, 9 pages.

Kolmakov et al., Enhanced Gas Sensing by Individual SnO2 Nanowires and Nanobelts Functionalized with Pd Catalyst Particles. Nano Lett. 2005, 5 (4), 667-673.

Kondalkar et al., Nanohybrids of Pt-Functionalized Al2O3/ZnO Core-Shell Nanorods for High-Performance MEMS-Based Acetylene Gas Sensor. ACS Appl. Mater. Interfaces 2019, 11 (29), 25891-25900.

Korotcenkov et al., The Influence of Gold Nanoparticles on the Conductivity Response of SnO2-Based Thin Film Gas Sensors. Applied Surface Science 2015, 353, 793-803.

(56) References Cited

OTHER PUBLICATIONS

Koziej et al., Water-Oxygen Interplay on Tin Dioxide Surface: Implication on Gas Sensing. Chemical Physics Letters 2005, 410 (4), 321-323.
Kuhne et al., Wafer-level flame-spray-pyrolysis deposition of gas-sensitive layers on microsensors. J. Micromech. Microeng. 18 (2008) 035040, 11 pages.
Kumar et al., Pd/ZnO nanorods based sensor for highly selective detection of extremely low concentration hydrogen, Sci. Rep. 7 (2017) 1-9.
Kwon et al., Zinc Oxide Thin Film Doped with Al2O3, TiO2 and V2O5 as Sensitive Sensor for Trimethylamine Gas. Sensors and Actuators B: Chemical 1998, 46 (2), 75-79.
Lee et al., Comparison Study of SnO2 Thin-and Thick-Film Gas Sensors. Sensors and Actuators B: Chemical 2000, 67 (1), 122-127.
Li et al., Modeling the Migration of Platinum Nanoparticles on Surfaces Using a Kinetic Monte Carlo Approach. J. Phys. Chem. C 2017, 121 (8), 4261-4269.
Li et al., MOF-derived hierarchical hollow ZnO nanocages with enhanced low-concentration VOCs gas-sensing performance. Sensors and Actuators B 225 (2016) 158-166.
Li et al., Synthesis and Highly Enhanced Acetylene Sensing Properties of Au Nanoparticle-Decorated Hexagonal ZnO Nanorings. RSC Advances 2015, 5 (106), 87132-87138.
Li et al., Xylene gas sensor based on Au-loaded WO3. H2O nanocubes with enhanced sensing performance, Sensors Actuators, B Chem. 238 (2017) 364-373.
Liu et al., Highly Active and Sintering-Resistant Heteroepitaxy of Au Nanoparticles on ZnO Nanowires for CO Oxidation. Journal of Energy Chemistry 2016, 25 (3), 361-370.
Liu et al., Sintering-Resistant Nanoparticles in Wide-Mouthed Compartments for Sustained Catalytic Performance. Scientific Reports 2017, 7 (1), 41773, 8 pages.
Liu et al., Synthesis, characterization, and m-Xylene sensing properties of Co—ZnO composite nanofibers, J. Am. Ceram. Soc. 94 (2011) 3437-3441.
Llobet et al., Screen-printed nanoparticle tin oxide films for high-yield sensor microsystems. Sensors and Actuators B 96 (2003) 94-104.
Lundström, Approaches and mechanisms to solid state based sensing, Sensors Actuators, B Chem. 35 (1996) 11-19.
Ma et al., Pt Nanoparticles Sensitized Ordered Mesoporous WO3 Semiconductor: Gas Sensing Performance and Mechanism Study. Advanced Functional Materials 2018, 28 (6), 1705268, 12 pages.
Maity et al., Understanding the anomalous conduction behavior in "n" type tungsten oxide thin film during hydrogen gas sensing: Kinetic analyses of conductance transients, Sensors Actuators, B Chem. 220 (2015) 949-957.
Miao et al., Nanometer-Thick Films of Aligned ZnO Nanowires Sensitized with Au Nanoparticles for Few-ppb-Level Acetylene Detection, ACS Appl. Nano Mater. 3 (2020) 9174-9184.
Miao et al., Self-Assembled Monolayer of Metal Oxide Nanosheet and Structure and Gas-Sensing Property Relationship. ACS Sens. 2019, 4 (5), 1279-1290.
Minceva et al., Adsorption of Xylenes on Faujasite-Type Zeolite: Equilibrium and Kinetics in Batch Adsorber. Chem. Eng. Res. Des. 82 (2004) 667-681.
Mitra et al., ZnO thin film sensor, Mater. Lett. 35 (1998) 33-38.
Mnethu et al., Ultra-sensitive and selective p-xylene gas sensor at low operating temperature utilizing Zn doped CuO nanoplatelets: Insignificant vestiges of oxygen vacancies, J. Colloid Interface Sci. 576 (2020) 364-375.
Mo et al., Volatile organic compound (VOC) emissions and health risk assessment in paint and coatings industry in the Yangtze River Delta, China, Environ. Pollut. 269 (2021) 115740, 10 pages.
Mukherjee et al., Analyses of response and recovery kinetics of zinc ferrite as hydrogen gas sensor, J. Appl. Phys. 106 (2009) 064912, 11 pages.
Nugraha et al., Density Functional Study on Benzene, Toluene, Ethylbenzene and Xylene Adsorptions on ZnO(100) Surface. Molekul 2019, 14 (1), 37-47.
Oh et al., Cobalt Nanoparticle Arrays made by Templated Solid-State Dewetting. Small 2009, 5 (7), 860-865.
Park et al., A ppb-level formaldehyde gas sensor based on CuO nanocubes prepared using a polyol process. Sensors and Actuators B 203 (2014) 282-288.
Parker et al., Reactivity and Sintering Kinetics of Au/TiO2(110) Model Catalysts: Particle Size Effects. Top Catal 2007, 44 (1-2), 3-13.
Parkinson et al., Carbon Monoxide-Induced Adatom Sintering in a Pd-Fe3O4 Model Catalyst. Nature Materials 2013, 12 (8), 724-728.
Peng et al., Pt-Doped SnO2 Nanoflower Gas Sensor Detection Characteristic for Hydrocarbon Gases Dissolved in Transformer Oil, In 2016 IEEE International Conference on High Voltage Engineering and Application (ICHVE); 2016; pp. 1-4.
Polarz et al., Structure—Property—Function Relationships in Nanoscale Oxide Sensors: A Case Study Based on Zinc Oxide. Advanced Functional Materials 2007, 17 (8), 1385-1391.
Puigcorbé et al., Thermo-Mechanical Analysis of Micro-Drop Coated Gas Sensors. Sensors and Actuators A: Physical 2002, 97-98, 379-385.
Qiang, Comparative Study on the Detection Characteristics of C2H2 in Various ZnO Nanosensors. IOP Conf. Ser.: Mater. Sci. Eng. 2019, 490, 022018, 9 pages.
Qiao et al., Acetylene Sensing Enhancement of Mesoporous ZnO Nanosheets with Morphology and Defect Induced Structural Sensitization. Sensors and Actuators B: Chemical 2017, 250, 189-197.
Rosental et al., Gas Sensing Properties of Epitaxial SnO2 Thin Films Prepared by Atomic Layer Deposition. Sensors and Actuators B: Chemical 2003, 93 (1), 552-555.
Roy et al., Temperature dependent resistivity study on zinc oxide and the role of defects, Mater. Sci. in Semiconductor Processing 16 (2013)332-336.
Saputro et al., Effect of surface defects on the interaction of the oxygen molecule with the ZnO(1010) surface, New J. Chem. 44 (2020) 7376-7385.
Segura et al., Origin of the Superior Hydrogenation Selectivity of Gold Nanoparticles in Alkyne + Alkene Mixtures: Triple-versus Double-Bond Activation. Journal of Catalysis 2007, 247 (2), 383-386.
Shen et al., Synthesis of Hierarchical 3D Porous ZnO Microspheres Decorated by Ultra-Small Au Nanoparticles and Its Highly Enhanced Acetylene Gas Sensing Ability. Journal of Alloys and Compounds 2018, 731, 1029-1036.
Simon et al., Micromachined Metal Oxide Gas Sensors: Opportunities to Improve Sensor Performance. Sensors and Actuators B: Chemical 2001, 73 (1), 1-26.
Simonsen et al., Ostwald Ripening in a Pt/SiO2 Model Catalyst Studied by in Situ TEM. Journal of Catalysis 2011, 281 (1), 147-155.
Song et al., Pt Nanocrystals: Shape Control and Langmuir—Blodgett Monolayer Formation. J. Phys. Chem. B 2005, 109 (1), 188-193.
Tai et al., Enhanced Ammonia Response of Ti3C2Tx Nanosheets Supported by TiO2 Nanoparticles at Room Temperature. Sensors and Actuators B: Chemical 2019, 298, 126874, 5 pages.
Tao et al., Langmuir—Blodgett Silver Nanowire Monolayers for Molecular Sensing Using Surface-Enhanced Raman Spectroscopy. Nano Lett. 2003, 3 (9), 1229-1233.
Tao et al., Tunable Plasmonic Lattices of Silver Nanocrystals. Nature Nanotechnology 2007, 2 (7), 435-440.
Tasaki et al., Fabrication of Sm-Based Perovskite-Type Oxide Thin-Films and Gas Sensing Properties to Acetylene. JST 2012, 02 (02), 75-81.
Tricoli et al., Wearable and Miniaturized Sensor Technologies for Personalized and Preventive Medicine. Advanced Functional Materials 2017, 27 (15), 1605271, 19 pages.
Uddin et al., Acetylene Gas Sensing Properties of Silver Nanoparticles Decorated ZnO Morphologies with Reduced Graphene Oxide Hybrids. In 2015 IEEE Sensors; 2015; pp. 1-4.

(56) References Cited

OTHER PUBLICATIONS

Uddin et al., Fabrication and Characterization of C2H2 Gas Sensor Based on Ag- Loaded Vertical ZnO Nanowires Array. Procedia Engineering 2015, 120, 582-585.

Uddin et al., Synthesis of Highly Dispersed ZnO Nanoparticles on Graphene Surface and Their Acetylene Sensing Properties. Sensors and Actuators B: Chemical 2014, 205, 338-344.

Wang et al., C2H2 Gas Sensor Based on Ni-Doped ZnO Electrospun Nanofibers. Ceramics International 2013, 39 (3), 2883-2887.

Wang et al., Low-Temperature and Highly Sensitive C2H2 Sensor Based on Au Decorated ZnO/In2O3 Belt-Tooth Shape Nano-Heterostructures. Sensors and Actuators B: Chemical 2017, 244, 344-356.

Watanabe et al., The Activation Energy for Oxygen Desorption from Zinc Oxide Surfaces, Jpn. J. Appl. Phys. 4 (1965) 945-947.

Wenas et al., Carrier Transport in High-Efficiency ZnO/SiO2/Si Solar Cells. Solar Energy Materials and Solar Cells 2006, 90 (18), 3261-3267.

Xiao et al., Study on ZnO-Based Gas Sensor for Detection of Acetylene Dissolved in Transformer Oil. In 2018 IEEE International Instrumentation and Measurement Technology Conference (I2MTC); 2018; pp. 1-6.

Yamazoe et al., Roles of Shape and Size of Component Crystals in Semiconductor Gas Sensors: I. Response to Oxygen. Journal of The Electrochemical Society 2008, 155 (4), J85-J92.

Yamazoe et al., Roles of Shape and Size of Component Crystals in Semiconductor Gas Sensors: II. Response to NO2 and H2. Journal of The Electrochemical Society 2008, 155 (4), J93-J98.

Yamazoe et al., Theory of Power Laws for Semiconductor Gas Sensors. Sensors and Actuators, B: Chemical 2008, 128 (2), 566-573.

Yang et al., Langmuir—Blodgett Assembly of One-Dimensional Nanostructures. ChemPhysChem 2002, 3 (6), 503-506.

Zhang et al., Gas Sensors Based on Flower-like ZnO Structures: Detection of Acetylene Gas Dissolved in Transformer Oil. In 2018 IEEE International Conference on High Voltage Engineering and Application (ICHVE); 2018; pp. 1-4.

Zhang et al., Ultrasensitive Flexible NH3 Gas Sensor Based on Polyaniline/SrGe4O9 Nanocomposite with Ppt-Level Detection Ability at Room Temperature. Sensors and Actuators B: Chemical 2020, 319, 128293, 10 pages.

Zhao et al., Tin Oxide Thin Films Prepared by Aerosol-Assisted Chemical Vapor Deposition and the Characteristics on Gas Detection. Sensors and Actuators B: Chemical 2010, 145 (2), 788-793.

Zhou et al., Research on Acetylene Sensing Properties and Mechanism of SnO2 Based Chemical Gas Sensor Decorated with Sm2O3. Journal of Nanotechnology, 2015, 714072, 8 pages.

\* cited by examiner

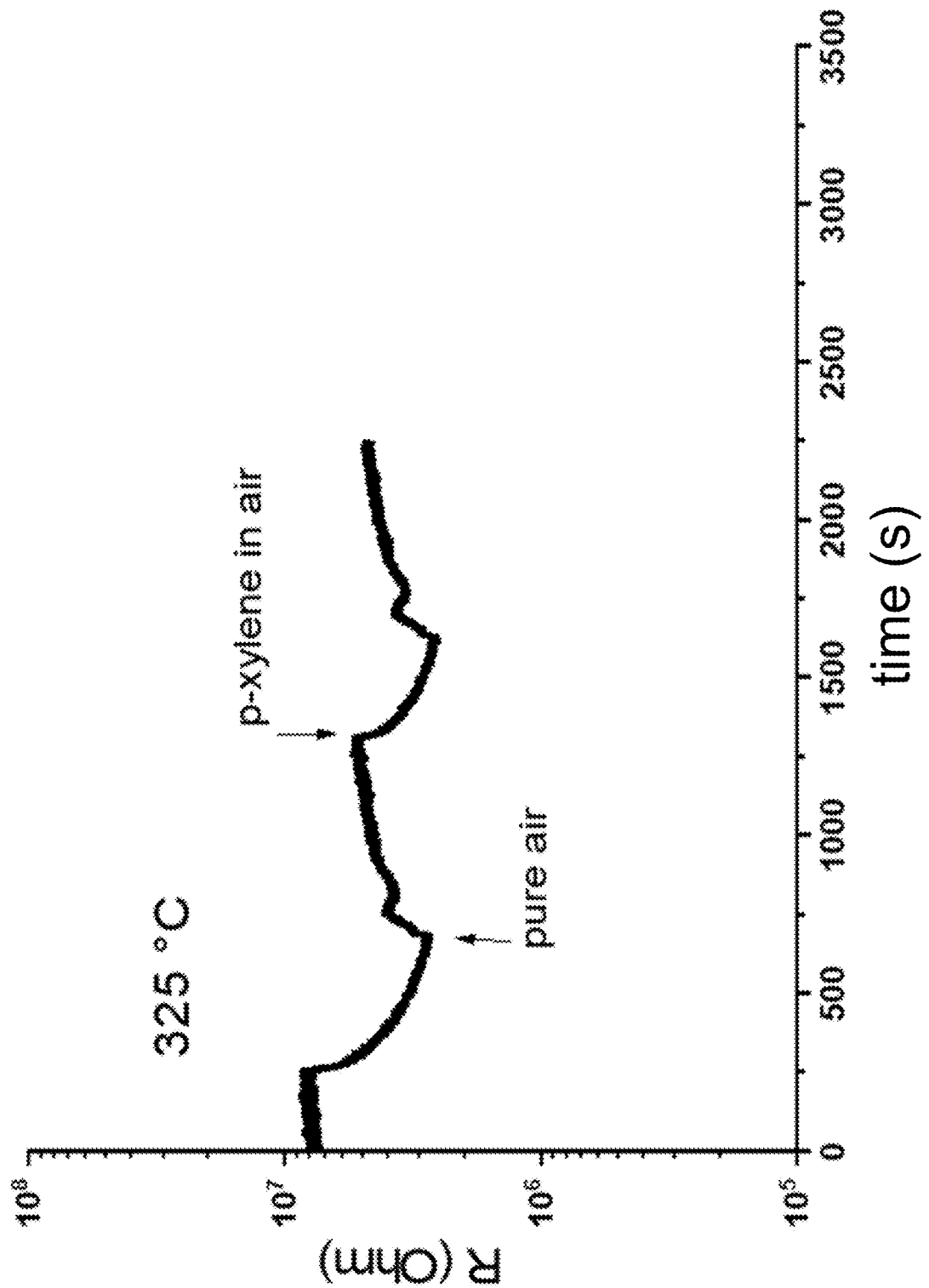

NOBLE METAL DECORATED ORDERED METAL OXIDE NANOSTRUCTURE THIN FILMS

CROSS-REFERENCE TO RELATED APPLICATION

This application claims the benefit of U.S. Patent Application No. 63/084,885 filed on Sep. 29, 2020, which is incorporated herein by reference in its entirety.

TECHNICAL FIELD

This invention relates to scalable fabrication of highly sensitive gas sensors having a thin film of aligned nanostructures of semiconducting metal oxide with noble metal nanoparticles disposed on the nanostructures.

BACKGROUND

Metal oxide (MOX) gas sensors are a type of solid-state sensing device capable of transducing the binding of an analyte to a measurable signal in the form of changes in electrical resistance. Sensing films in commercial MOX gas sensors are typically about 1 micron to about 50 microns thick.

SUMMARY

This disclosure describes Langmuir-Blodgett assembly of thin nanostructured films of aligned metal oxide nanowires with a patterned surface, followed by sensitization with noble metal nanoparticles by sputtering and post-annealing, as well as films produced by this method and devices including these films. The ridges of the nanopatterns act as diffusion barriers capable of preventing the noble metal nanoparticles from sintering via particle migration and growth (PMC). The resulting metal oxide Langmuir-Blodgett films have a high dispersion of small noble metal nanoparticles and function as a responsive conductance switch with a high sensitivity and detection limit towards toxic gases such as acetylene ($C_2H_2$), a key marker gas for air pollution caused by anthropogenic emission, and volatile organic compounds such as xylene, exposure to which can cause significant health problems.

One example involves ultrathin nanostructured films of aligned ZnO nanowires with periodic v-grooves obtained via Langmuir Blodgett assembly. The sintering behavior of Au clusters on ZnO_LB film was analyzed based on the evolution of particle size distribution. Au nanoparticles (NPs) are observed to achieve a stable size of 11 nm on ZnO_LB film, while particle sintering and growth is still observed after Au NPs grew beyond 20 nm on conventional thin film. The origin of the sintering resistance on ZnO_LB film is attributed to the ridges of the v-grooves, which serve as diffusion barriers for particle migration. The sensing performance of pristine ZnO_LB film is superior to conventional thin film in all key parameters, due at least in part to the high gas accessibility of ZnO_LB film. With high dispersion of small Au NPs as surface dopants, the ZnO_LB film is converted into a highly responsive conductance switch, the bulk conductivity of which is fully determined by its surface chemistry. Unprecedented sensitivity (37 $ppm^{-1}$) and detection limit (3 ppb) towards acetylene ($C_2H_2$) are observed for the Au-doped ZnO_LB film.

In a first general aspect, forming a compressed thin film of metal oxide nanostructures includes dispersing a multiplicity of hydrophobic metal oxide nanostructures onto a surface of a layer of water to yield a thin film of the hydrophobic metal oxide nanostructures on the water. The hydrophobic metal oxide nanostructures have a common orientation with respect to the surface of the water; and compressing the thin film of the hydrophobic metal oxide nanostructures yields a compressed thin film of the hydrophobic metal oxide nanostructures.

Implementations of the first general aspect may include one or more of the following features.

In some implementations, the multiplicity of metal oxide nanostructures have a common shape (e.g., triangular prisms, hexagonal prisms, or tetrahedra). The multiplicity of metal oxide nanostructures can include zinc (II) oxide nanowires. The zinc (II) oxide nanowires typically have a hexagonal cross section, and a length of each of the zinc (II) oxide nanoparticles can be aligned in a common direction.

Certain implementations include forming the forming the zinc (II) oxide nanowires by a solvothermal process before dispersing a multiplicity of hydrophobic metal oxide nanostructures onto the surface of the layer of water. In one example, the layer of water is in a Langmuir-Blodgett trough. The thin film can be a monolayer.

Certain implementations include transferring the compressed thin film onto a substrate. Examples of suitable substrates include silicon, glass, and organic polymers. In some cases, the substrate is a preprinted electrode. After transferring the compressed thin film onto a substrate, some implementations include disposing a multiplicity of noble metal nanoparticles on the compressed thin film to yield a noble metal decorated ordered metal oxide nanostructure thin film. Disposing the multiplicity of noble metal nanoparticles on the compressed thin film can be achieved by physical vapor deposition, chemical vapor deposition, atomic layer deposition, or electroplating. In one example, the noble metal nanoparticles are gold nanoparticles. The (unaggregated) noble metal nanoparticles typically have a diameter in a range of about 5 nm to about 15 nm. In some cases, after disposing the multiplicity of noble metal nanoparticles on the compressed thin film, the multiplicity of noble metal nanoparticles undergo solid state dewetting. Certain implementations include heating the compressed thin film, thereby agglomerating some of the multiplicity of the noble metal nanoparticles.

In a second general aspect, a sensing film includes the noble metal decorated ordered metal oxide nanostructure thin film of the first general aspect. In one implementation of the second general aspect, the sensing film is configured to detect an analyte gas at a part-per-billion concentration.

In a third general aspect, a sensing film configured to detect an analyte gas includes a metal oxide thin film and noble metal nanoparticles disposed on the metal oxide thin film.

Implementations of the third general aspect may include one or more of the following features.

The metal oxide thin film can be a monolayer. In one example, the metal oxide thin film includes aligned zinc (II) oxide nanowires. The zinc (II) oxide nanowires can be hexagonal, prism-shaped nanowires. The noble metal nanoparticles can be gold nanoparticles.

In some implementations, the sensing film is configured to detect the analyte gas in hydrogen gas, carbon monoxide, methane, ethane, ethene, acetylene, or a combination thereof. In one example, the analyte gas is hydrogen sulfide. In other examples, the analyte gas can be a volatile organic compound, such as ethanol, acetone, formaldehyde, or xylene isomers.

A surface of the sensing film can have nanometer-scale periodic V-shaped grooves that stabilize the noble metal nanoparticles. The V-shaped grooves can be defined by a surface of the metal oxide thin film.

The described fabrication method for stabilized nanometric metals on Langmuir Blodgett films allows improved sensitivity of thin sensing films and can also be applied to other metal nanodot-based applications, such as solar cells, plasmon-resonance waveguides, and biosensors.

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

FIGS. 10A-10C show the cyclic transient resistance responses of Au—ZnO sensor in gas stream switching between pure air and air containing 0.959 mol % mol p-xylene/air mixture at 325° C., 365° C., and 405° C., respectively.

DETAILED DESCRIPTION

This disclosure describes a Langmuir-Blodgett fabrication process to deposit nanostructured thin films of aligned semiconducting metal oxide nanostructure arrays with topographic structure on the substrate surface. In some cases, the nanostructured thin films are monolayers. As used herein, "nanostructures" refer to nanorods, nanowires, and other elongated structures having a width or diameter of about 100 nm or less. The nanostructures can have multifaceted crystal morphology. Examples of suitable semiconducting metal oxides include zinc oxide, tin oxide, tungsten oxide, indium oxide, etc. Nanostructures in the nanostructure arrays typically have a width in a range of about 10-30 nm (e.g., about 20 nm) and a length in a range of about 0.5-1.5 μm (e.g., about 1 μm). The nanostructured thin films typically have a thickness in a range of about 10-30 nm (e.g., about 20 nm). The multifaceted crystal morphology can provide peak-and-valley features with a peak-to-valley dimension between about 1-10 nm.

The topographic structure can be periodic. Examples of suitable topographic structures include periodic v-grooves, inverted pyramid arrays, and other appropriate structures. The Langmuir-Blodgett film is sensitized with noble metal nanoparticles (e.g., platinum, palladium, gold, silver, etc.) by sputtering and post-annealing. The noble metal nanoparticles typically have a diameter in a range of about 5 nm to about 15 nm. In some cases, the nanoparticles form clusters or agglomerates on the Langmuir-Blodgett film. As used herein, "nanoparticles" generally refer to nanoparticles as well as clusters or agglomerates of two or more nanoparticles. The topographic structure stabilizes the noble metal nanoparticles on the Langmuir-Blodgett film. The resulting films ("sensing films") have a high-surface to-volume ratio of one-dimensional nanostructures (e.g., typically in a range of about 0.2-0.5 $nm^{-1}$). The sensing films are porous and typically have a thickness in a range of 10-30 nm.

Figure 13:
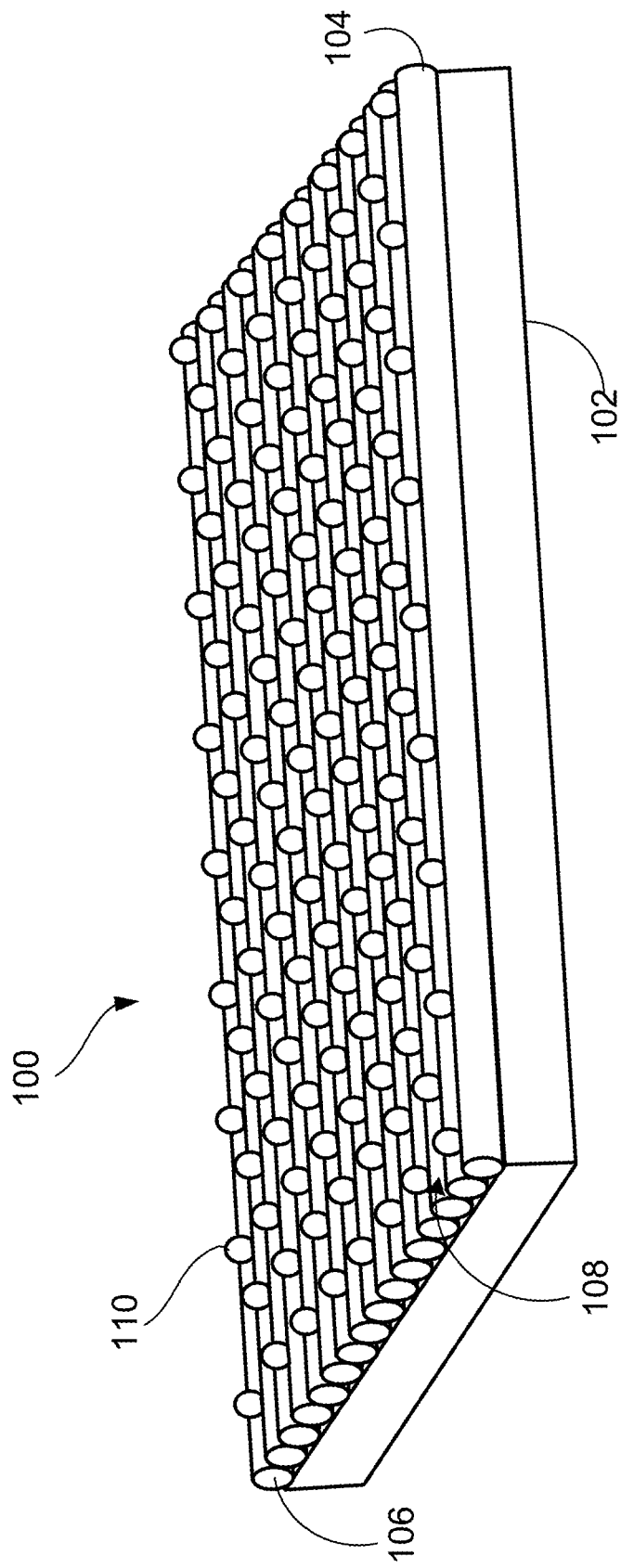
FIG. 13 depicts an embodiment of a sensing film as described herein.

FIG. 13 depicts sensing film 100. Sensing film 100 includes substrate 102 and metal oxide thin film 104. Substrate 102 can be composed of silicon, glass, or an organic polymer. In some cases, substrate 102 is a preprinted electrode. Metal oxide thin film 104 can be a monolayer formed of metal oxide nanostructures. In some cases, metal oxide thin film 104 includes aligned nanowires 106. In one example, aligned nanowires 106 are aligned zinc (II) oxide nanowires. Aligned nanowires 106 can be hexagonal, prism-shaped nanowires, such that a surface of metal oxide thin film 104 defines nanometer-scale periodic V-shaped grooves 108. Noble metal nanoparticles 110 are disposed on metal oxide thin film 104. In one example, noble metal nanoparticles 110 are gold nanoparticles. Sensing film 100 is configured to detect an analyte gas in hydrogen gas, carbon monoxide, methane, ethane, ethene, acetylene, or a combination thereof. The analyte gas can be a gas (e.g., hydrogen sulfide) or a volatile organic compound (e.g., ethanol, acetone, formaldehyde, or xylene isomers).

The porous sensing film promotes analyte gas accessibility. The nanostructure alignment facilitates unidirectional electron/hole conduction within the sensing film. With the addition of noble metal dopants, the local charge carrier density can become fully depleted considering the small radius of the nanowires, which is close to the Debye length. As a result, a conductance switch, the electrical conductance of which can be altered from insulating to conductive in response to the presence of low concentration of analyte gas, can be obtained.

Fabrication of the nanostructured thin films includes dispersion of functionalization of semiconducting metal oxide nanostructures in a solvent to form a stable colloidal solution. The stable colloidal solution typically includes a surfactant. The colloidal solution is disposed onto a water subphase of a Langmuir-Blodgett trough. The colloidal solution spreads on the water subphase to yield a monolayer of aligned nanostructures. The monolayer of aligned nanostructures is compressed at a line speed in a range of about 1-5 cm/min (e.g., about 2.5 cm/min) until the surface pressure in a range of about 38-42 mN/m (e.g., about 40 mM/m). The aligned nanowire monolayer is transferred to a pre-submerged substrate by lifting the substrate at a rate in a range of about 10-20 mm/min (e.g., about 15 mm/min). Examples of suitable substrates include glass, silicon, polyimide, and the like. In some cases, the substrate has a preprinted interdigitated electrode. The monolayer films are calcined to remove any surfactant present in the colloidal solution. A noble metal film is deposited on the monolayer films (e.g., by sputtering). A thickness of the noble metal film is typically in a range of about 0.3-0.7 nm (e.g., about 0.5 nm). A base pressure before deposition is typically in a range of about $0.5-1.5 \times 10^{-7}$ Torr (e.g., about $1 \times 10^{-7}$ Torr). Deposition of the noble metal film is typically carried out at a pressure in a range of about 4-6 mTorr (e.g., about 5 mTorr) in an inert gas (e.g., argon) at a power in a range of about 45-55 W (e.g., about 50 W). The noble metal/metal oxide films are then heated at a temperature in a range of about 300° C. to about 500° C. for a length of time in a range of about 20-40 hours to yield noble metal nanoparticles in selected size ranges.

EXAMPLES

ZnO nanowire synthesis: ZnO nanowires were synthesized via a solvothermal process. In a typical synthesis process, 1 mmol zinc nitrate hexahydrate ($Zn(NO_3)_2.6H_2O$, 98+%, Sigma-Aldrich) was first dissolved in 10 mL ethanol (anhydrous, Koptec). The zinc nitrate solution was then added into 20 mL of 1.25 M sodium hydroxide (NaOH, 97+%, Sigma-Aldrich) ethanol solution. The as-formed white suspension was ultrasonicated for 15 min before being transferred and sealed in a Teflon-lined stainless-steel autoclave (50 mL capacity). The autoclave was heated and maintained at 100° C. for 24 h. Afterwards, the autoclave was cooled down to room temperature and the precipitates were separated and washed by centrifugation. Finally, the precipitates were dried in a vacuum oven at 70° C. for 12 h.

ZnO nanowire surface functionalization: In a glovebox, 0.05 g ZnO nanowire was first dispersed in 50 mL of 2-propanol (reagent, Sigma Aldrich). Then 0.5 mL of 20 mM 1-dodecanethiol (≥98%, Sigma Aldrich)/2-propanol solution was added into the ZnO solution while stirring. The solution was kept at room temperature under constant stirring for at least 12 hours, before being removed from glovebox. The solution was centrifuged (5 krpm, 10 min) and the product was washed with 2-propanol twice to remove any excess thiol. The final pellet was dried under vacuum at room temperature overnight.

ZnO nanowire Langmuir-Blodgett Assembly: 2 mg of functionalized ZnO nanowire powder was first dispersed into 3.4 mL of a mixed solvent (v(toluene)/v(2-propanol) =1.5) to form a stable colloidal solution. The solution of dispersed nanowires was then spread dropwise onto the water subphase of a Langmuir-Blodgett trough (Nima Technology, model 1212D1) at a rate of 1.5 mL/hr using a syringe pump (KD scientific). After spreading all the nanowire colloid, the two barriers started to compress with a line speed of 2.5 cm/min, until the surface pressure reached around 40 mN/m. The aligned nanowire monolayer was then transferred to a pre-submerged substrate (glass or glass with preprinted interdigitated electrode, Metrohm) by lifting the substrate at 15 mm/min. The as-formed films were calcined at 300° C. for 1 hr to remove the surfactant.

ZnO thin film by radio frequency (RF) sputtering: ZnO thin films were deposited on glass and sensor substrates by RF sputtering at room temperature. Sputtering was performed using ZnO sputter target (Kurt J. Lesker, 99.9%). The base pressure before deposition was around $1 \times 10^{-7}$ Torr. Sputtering was carried out at a pressure of 10 mTorr in pure Ar and at a power of 100 W. The thickness of the ZnO thin film was measured with a profilometer (Dektak XT stylus profilometer) to be around 100 nm.

ZnO nanoplates with <100> exposed: ZnO nanoplates with predominant <100> face were synthesized. In a typical experiment, 0.287 g of $ZnSO_4$ $4H_2O$ (98%, Alfa Aesar), 0.080 g of NaOH (97+%, Sigma-Aldrich), and 0.083 g of NaF (99.99%, Alfa Aesar) were successively added into a mixed solvent of 7 mL of distilled water and 3 mL of ethanol. The resulting mixture was sonicated for several minutes and transferred into a Teflon-lined stainless-steel autoclave with a capacity of about 20 mL. Then the autoclave was heated to 200° C. and held for 24 h. After the mixture was cooled to room temperature, the production was separated by centrifugation from the solution and repeatedly rinsed with distilled water.

Au NPS loading: Au films around 0.5 nm thick were sputtered on the three types of ZnO thin films by DC sputtering at room temperature. The base pressure before deposition was around $1 \times 10^{-7}$ Torr. Sputtering was carried out at a pressure of 5 mTorr in pure Ar and at a power of 50 W. Post-heat treatments were applied on Au/ZnO film at 400° C. and 350° C. for different period to obtain Au nanoparticles (NPs) of different size and distribution.

Materials characterization: SEM images were collected on an AMARY 1910 at 15 kV. The particle size distribution of Au nanoislands were extracted using ImageJ from the SEM images. XRD measurements were performed on a Bruker D8 focus diffractometer using Cu Kα radiation ($\lambda$=1.5406 Å) with a step size of 0.02° and a scan rate of 0.6 sec/step. Atomic force microscopy (AFM) imaging was performed in ScanAsyst noncontact mode on a Bruker Multimode 8 system with ScanAsyst tips (Bruker). NanoScope Analysis was used for image processing. TEM, HRTEM, and SAED images were collected on a Philips CM-200-FEG 139 at 200 kV.

Figure 1A:
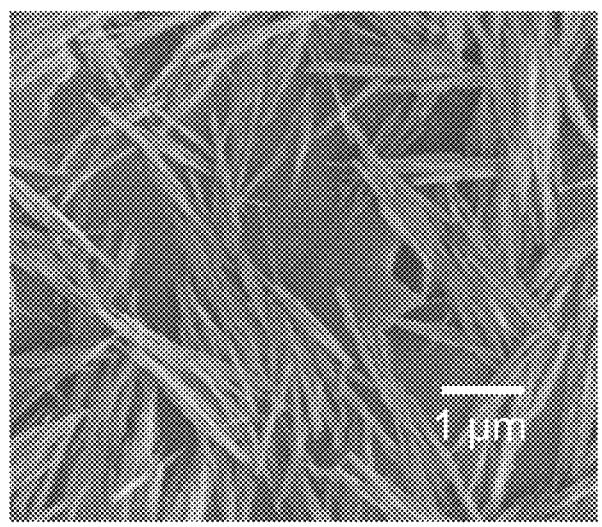
FIG. 1A is a scanning electron microscopy (SEM) image of as-synthesized ZnO nanowires.
Figure 1B:
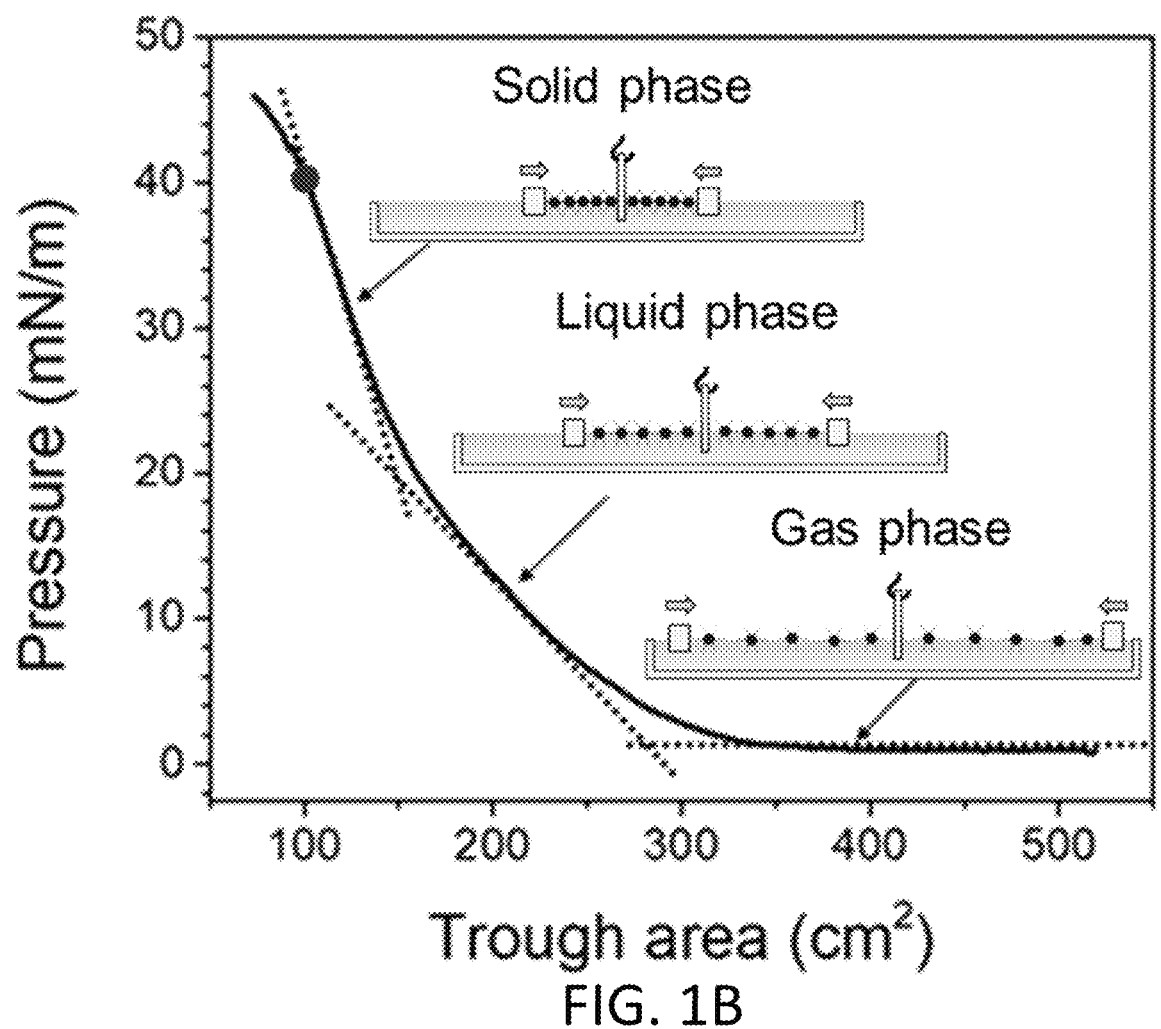
FIG. 1B shows surface pressure versus area isotherm of floating ZnO nanowires.

Fabrication of Nanostructured ZnO_Langmuir-Blodgett film: As shown in FIG. 1A, ZnO nanowires with diameter and length around 20 nm and 1 μm, respectively, were first synthesized as the nano-building blocks for the nanostructured ZnO_Langmuir-Blodgett film (ZnO_LB). For the nanowires to float at the water-air interface and assemble into film by LB technique, the surface of the nanowires was functionalized with an amphiphilic surfactant (i.e., 2-dodecanthiol) to achieve a certain level of hydrophobicity. After successful functionalization signalized by the emergence of C—H vibrational peak in the Fourier-transform infrared spectroscopy (FTIR) spectrum, the ZnO nanowires were dispersed in a mixed organic solvent (i.e., toluene/2–propanol) and a stable colloidal solution was obtained. To identify the optimal surface pressure for forming a ZnO_LB film composed of a monolayer of densely packed and well-aligned ZnO nanowires on the water subphase and transferring the film onto a solid substrate, the surface pressure versus area (π-A) isotherm was recorded and displayed in FIG. 1B. The isotherm revealed a typical three-stage evolution given rise by the change in the proximity of the floating wires. Applying excessive pressure to monolayer film in the solid phase will destabilize the monolayer, and defects, such as overlaps and folds, will form. Therefore, the optimal surface pressure was selected at 40 mN/m to achieve maximum packing density of nanowires.

Figure 1C:
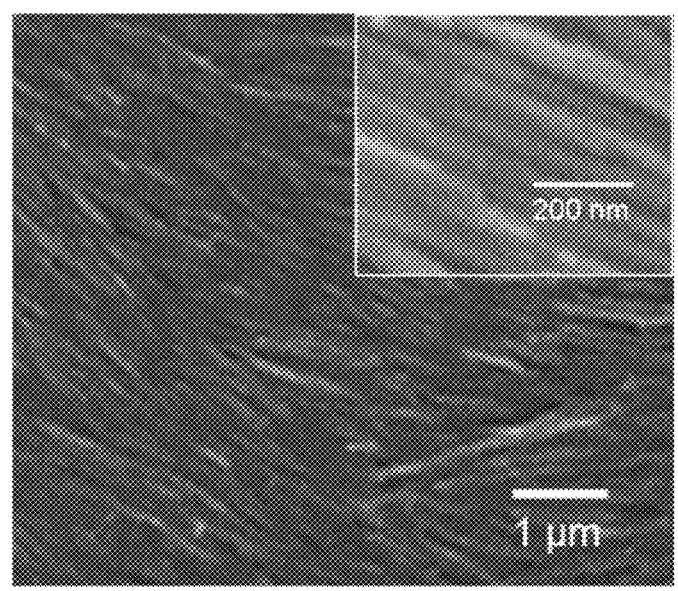
FIG. 1C shows SEM images of ZnO_LB film on Au-IDE-coated glass substrate.
Figure 1D:
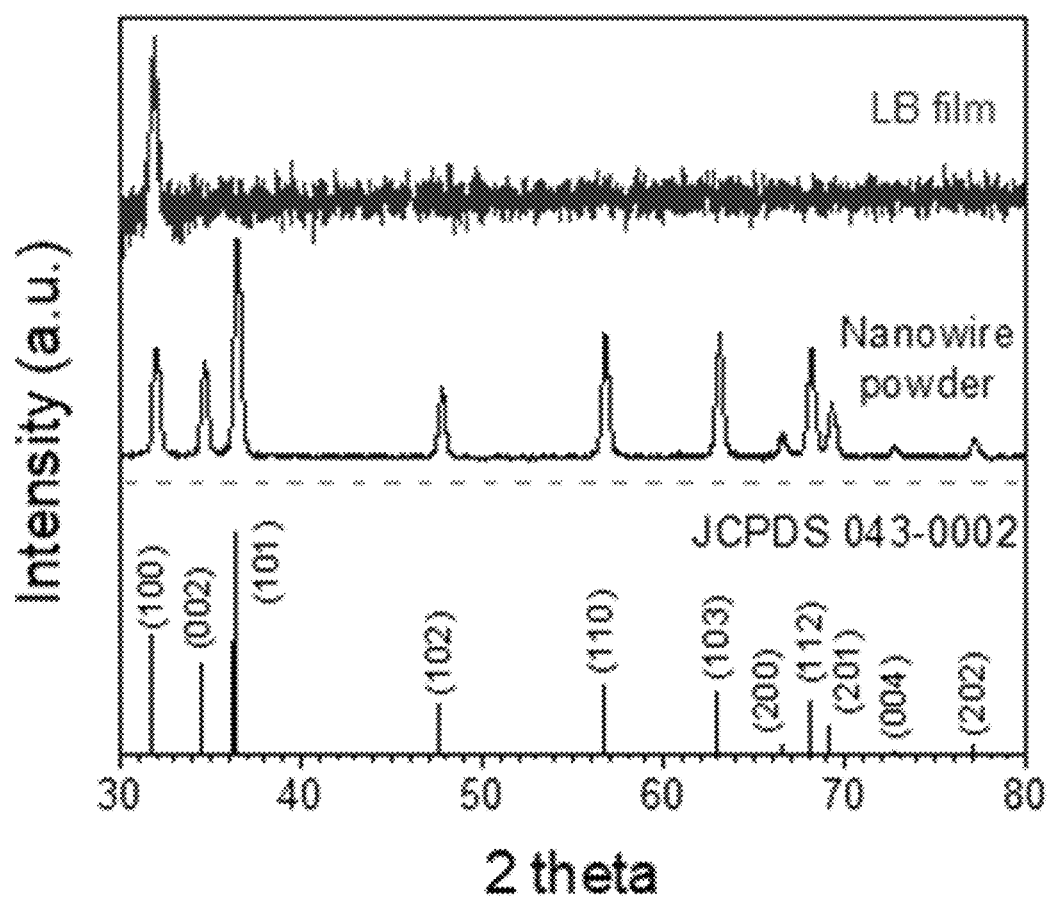
FIG. 1D shows x-ray diffraction (XRD) patterns of ZnO nanowires and ZnO_LB film.
Figure 1E:
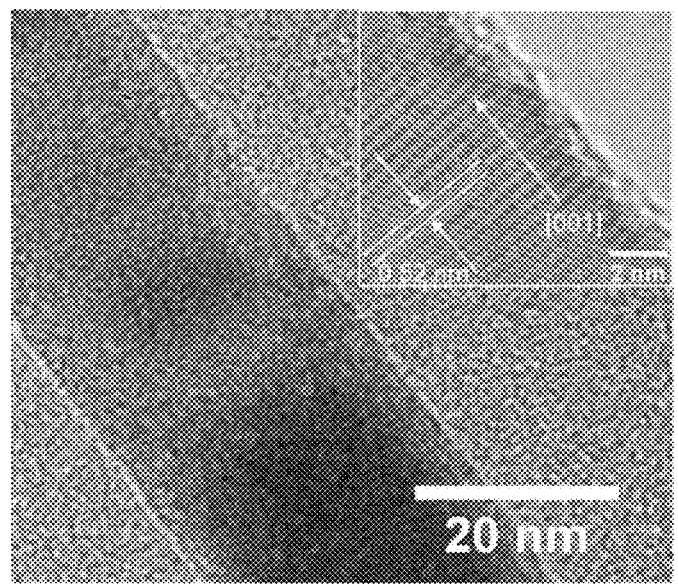
FIG. 1E shows a transmission electron microscopy (TEM) image of ZnO nanowires and a high-resolution TEM image showing the lattice fringes (inset).
Figure 1F:
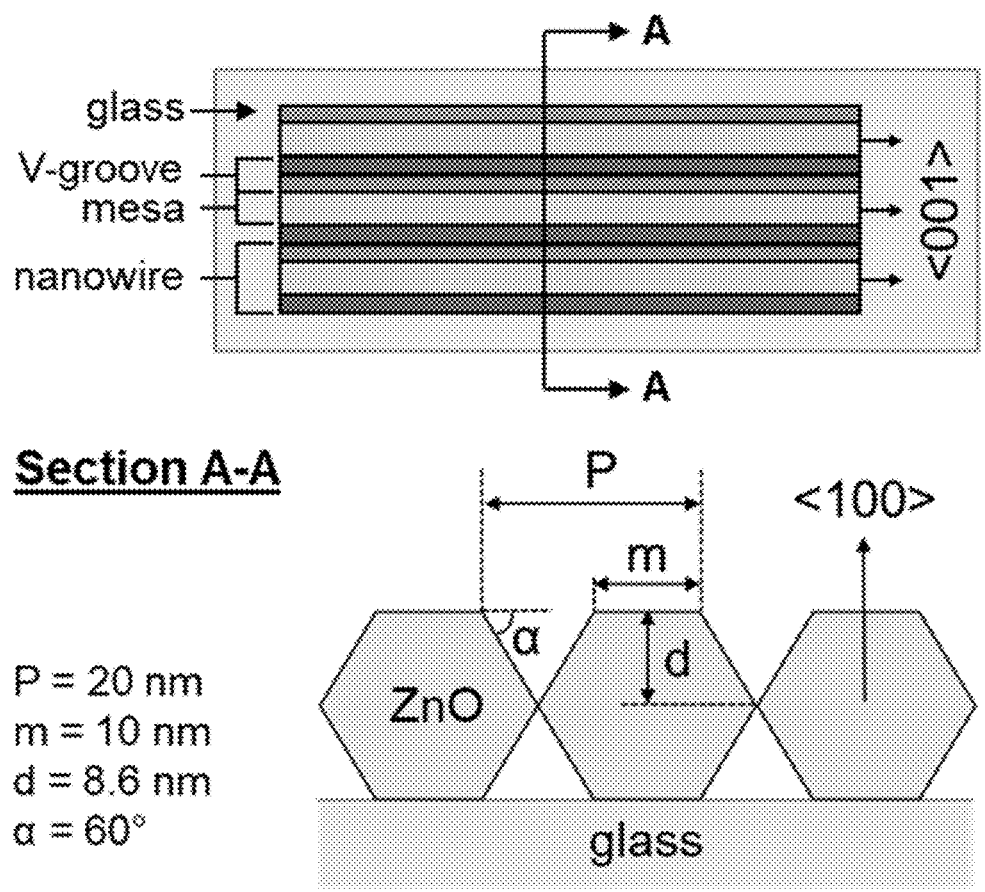
FIG. 1F is an illustration of v-groove topography exhibited by ZnO_LB film.

The morphology and texture of ZnO_LB film deposited on a glass substrate with preprinted Au interdigitated electrodes were characterized. As shown in FIG. 1C, the nanowires were densely packed and well aligned over a large area, although some defects were observed presumably due to the short nanowires formed by breakage of long nanowires during the sonication-based dispersion processes. In FIG. 1D, the x-ray diffraction (XRD) pattern of ZnO_LB film indicates that the film consists of hexagonal wurtzite ZnO nanowires, which are strongly <100>-oriented along the surface normal. It is speculated that ZnO nanowires reoriented and form high-order structure driven by capillary force during the drying process after the film is transferred onto a solid substrate. The ZnO nanowires were analyzed with high-resolution transmission electron microscopy (HR-TEM), and <001> is identified as the preferential growth direction based on the d-spacing of the lattice fringes (FIG. 1E). Considering the hexagonal wurtzite crystal structure, the ZnO nanowires should adopt a hexagonal prism shape with <100> as major surface planes, and the side length and the diagonal length of the hexagonal bases is 10, and 20 nm, respectively. Consequently, the surface topography of ZnO_LB film can be represented by the illustration shown in FIG. 1F, which can be described as periodic v-shaped grooves 10 nm wide and 8.6 nm deep separated by 10 nm wide mesas.

Figure 2A:
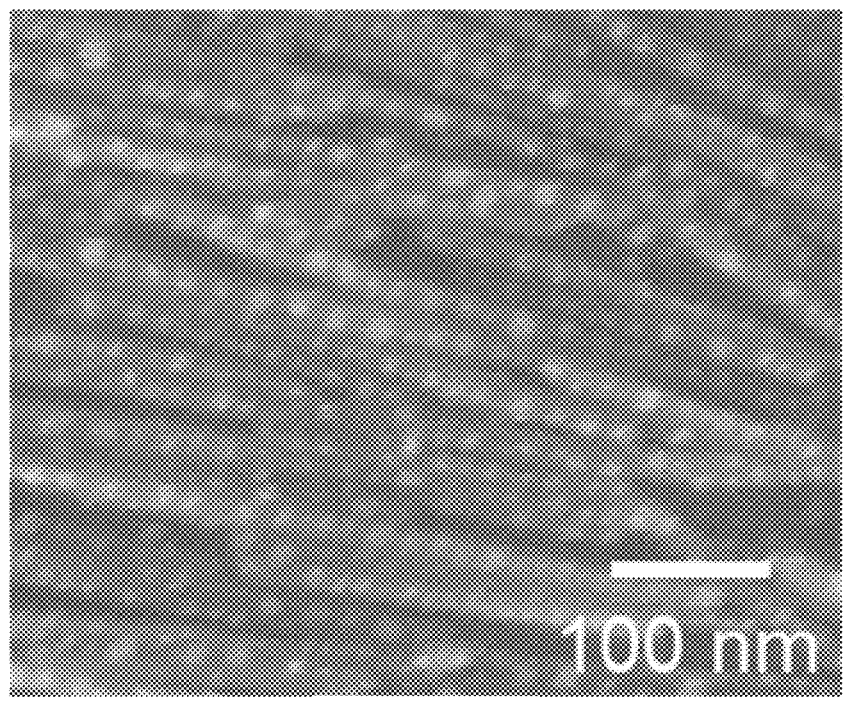
FIG. 2A is a SEM plane view of Au doped on ZnO_LB film annealed at 400° C. for 24 h.
Figure 2B:
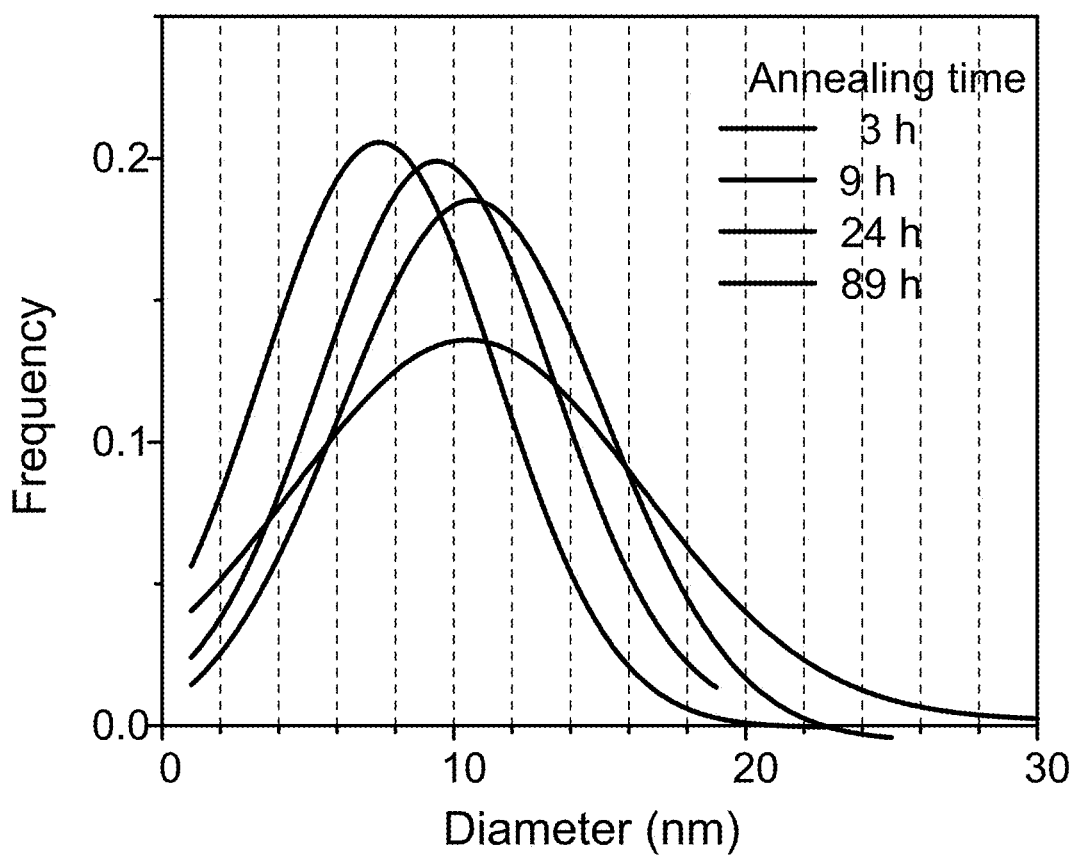
FIGS. 2B and 2C show evolution of Au particle size distribution and mean diameter, respectively, with annealing time on ZnO_LB film.
Figure 2C:
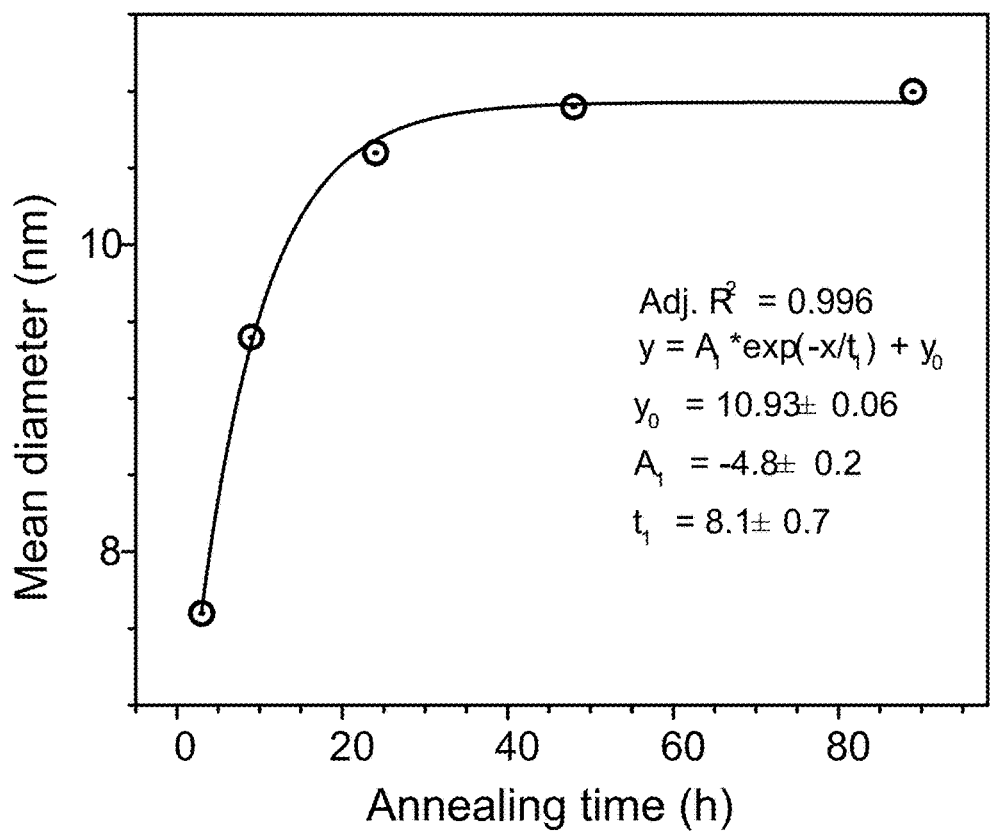

Au nanoparticles loading and stabilization: Au nanoparticle catalyst was loaded on the ZnO_LB film by DC sputtering of Au film followed by post-annealing at 400° C. The Au loading percentage was estimated to be around 13 wt % for 0.5 nm of Au film sputtered. As shown in FIG. 2A, Au NPs with diameters close to the mesa width (m=10 nm) were observed to form along the ZnO nanowire after 24 h of annealing treatment. Higher loadings (26 wt %/1 nm and 39 wt %/1.5 nm) were also tested, but Au NPs 4-6 times as large as the mesa were obtained after annealing, indicating that the surface topographic features of the ZnO_LB film were ineffective to contain sintering at these high loading percentages. FIGS. 2B and 2C show the evolution of the statistical information of Au NPs size obtained from an isothermal kinetic analysis. Within the whole range of annealing time (3-89 h), the particle size distribution remains Gaussian despite the increases in mean diameter and variance of Au NPs. Moreover, the mean diameter initially increases quickly with annealing time, but growth rate quickly drops when the Au NPs size approaches 11 nm, a value close to the mesa width.

Figure 2D:
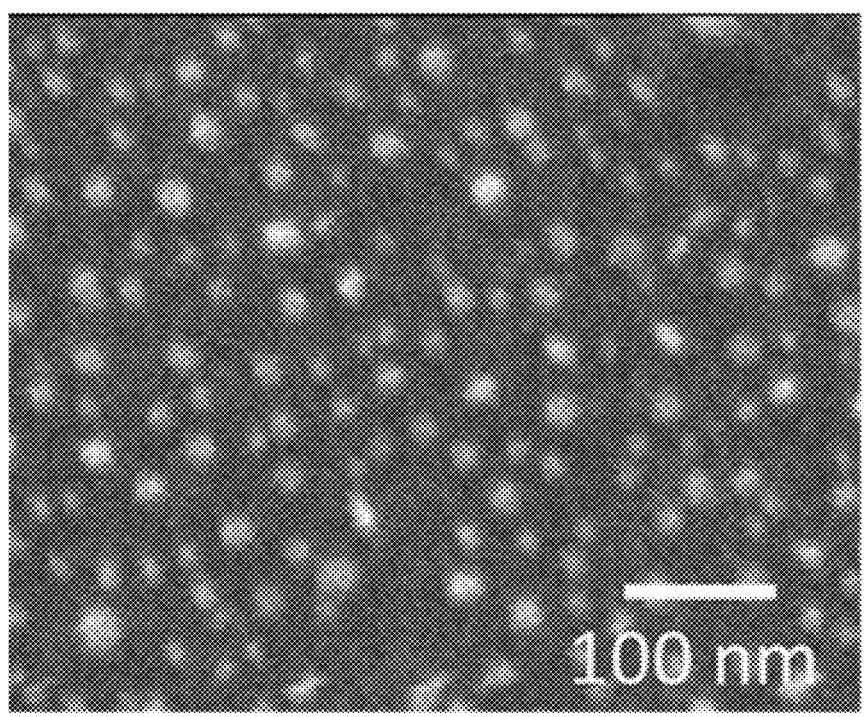
FIG. 2D is a SEM plane view of Au doped on ZnO_S film annealed at 400° C. for 24 h.
Figure 2E:
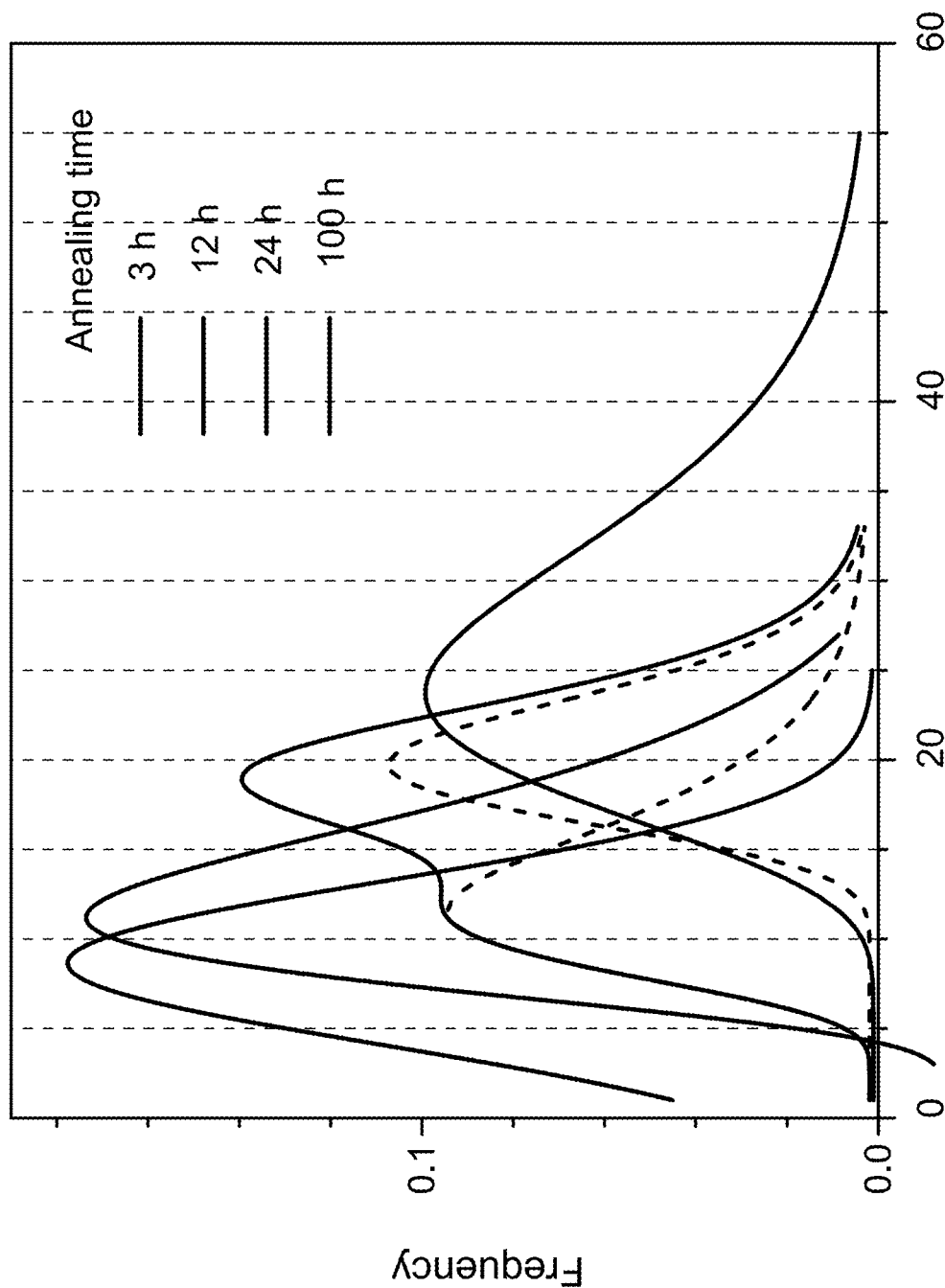
FIGS. 2E and 2F show evolution of Au particle size distribution and mean diameter, respectively, with annealing time on ZnO_S film.
Figure 2F:
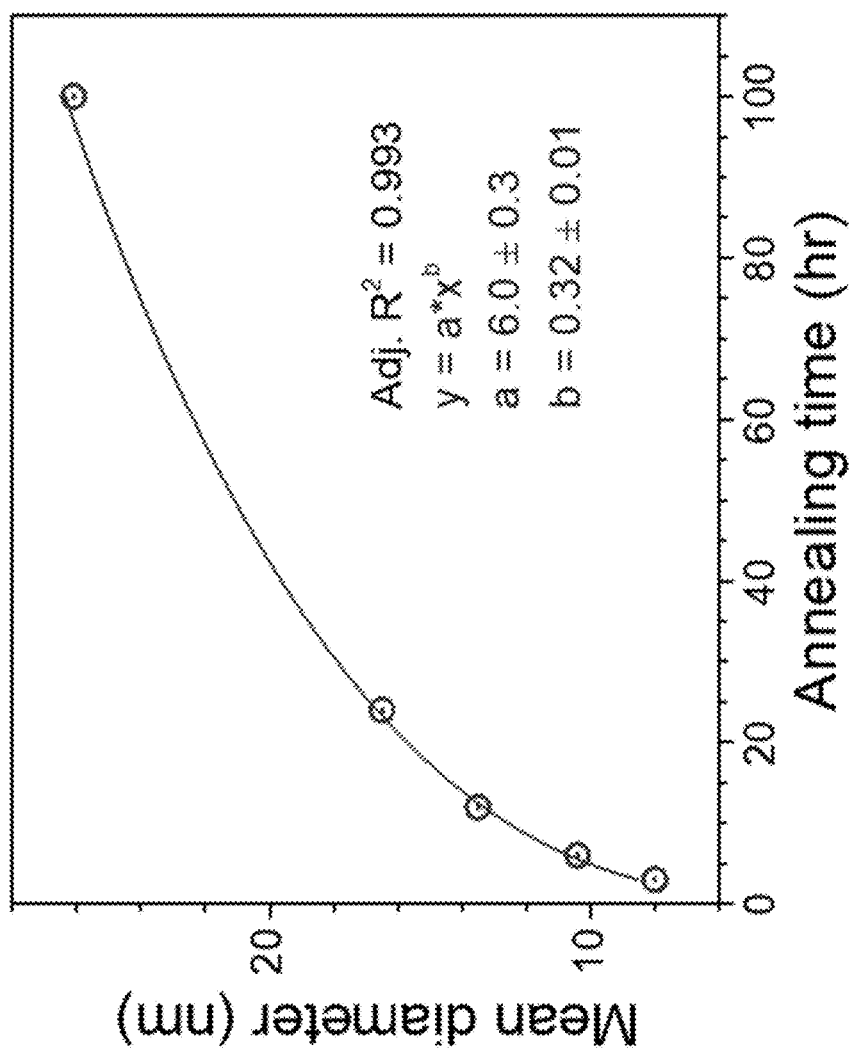

To verify that the sintering of Au NPs was suppressed on ZnO_LB film, the sintering behavior of Au NPs on a ZnO thin film prepared by a conventional sputtering technique was investigated. The polycrystalline ZnO Sputtered film (ZnO_S) was 50 nm thick with a lateral grain diameter of around 10 nm. Moreover, the surface comprises predominantly (002) planes and the roughness is as low as 1.01 nm. As shown in FIG. 2D, the Au NPs grew nearly twice as large and populated the ZnO_S film much more sparsely than on ZnO_LB film after going through the same annealing treatment. Moreover, when the annealing time was varied between 3-100 h, the particle size distribution of Au NPs reveals the evolution of a series of lognormal size distributions with long tails toward the direction of the larger sizes from an initial Gaussian-like shape obtained after 3 h of annealing (FIG. 2E). This lognormal size distribution indicates particle migration and coalescence (PMC) as the dominant sintering mechanism. As the name PMC suggested, for supported metal catalysts to sinter and growth, smaller particles migrate in Brownian motion fashion and when binary collision occurs, two smaller particles will fuse into one bigger particle. Generally, PMC is expected to dominate only in the initial stage of the sintering process, since the mobility of metal nanoparticles drops quickly with particle size. However, direct observations of coalescences of two particles as large as 20 nm were recorded for Au NPs support on ZnO_S film at the advanced stage of the sintering process (100 h at 400° C.), which suggests that PMC could be the dominant sintering mechanism for the entire sintering process. Overall, the mean diameter of Au NPs increased with annealing time by a power of around 0.3 from 9 to 26 nm (FIG. 2F), which are larger than from 7 to 11 nm for ZnO_LB film. Thus, an improvement in the sintering resistance of Au NPs on ZnO_LB film was confirmed.

Figure 3A:
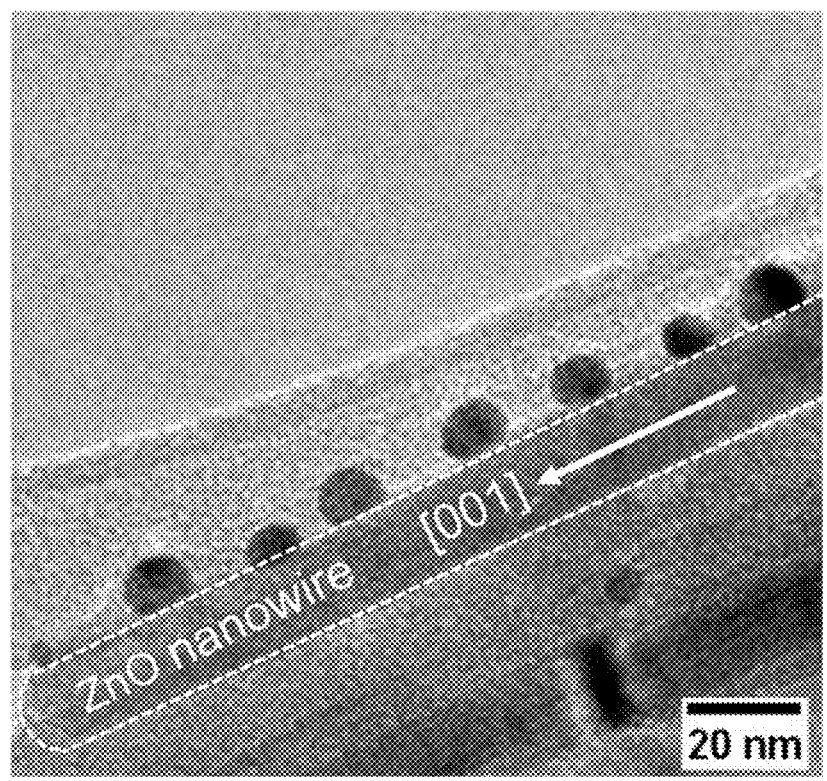
FIG. 3A is a TEM image of Au nanoparticles supported on ZnO nanowires after annealing treatment at 400° C. for 12 h.
Figure 3B:
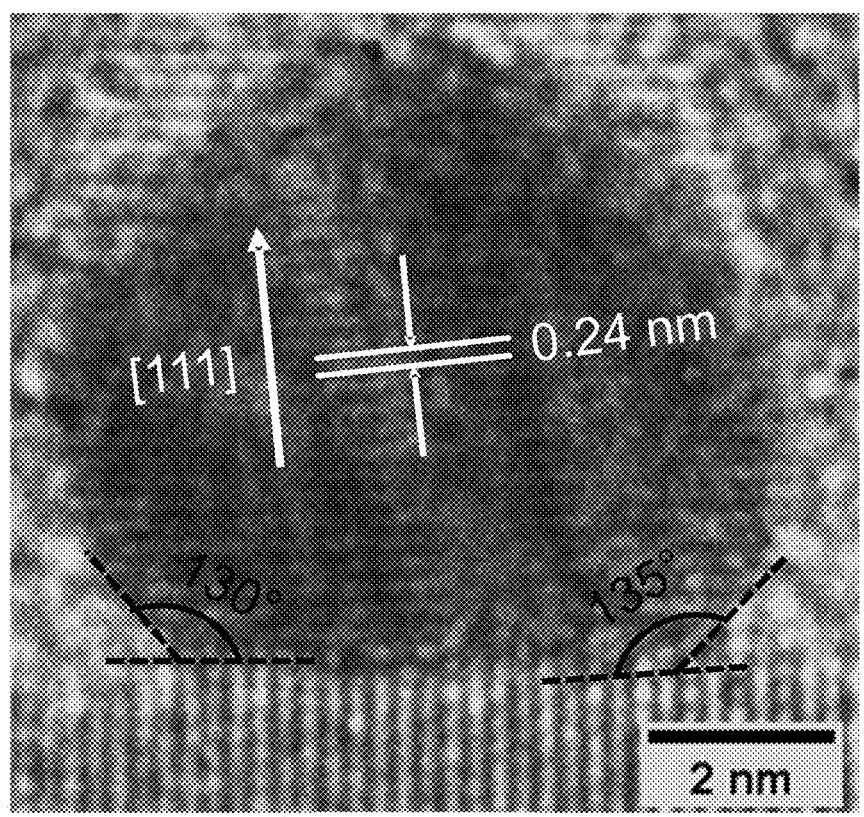
FIG. 3B is a high-resolution TEM image of supported gold nanoparticles revealing a <111> growth direction and high contact angles of 130° and 135°.
Figure 3C:
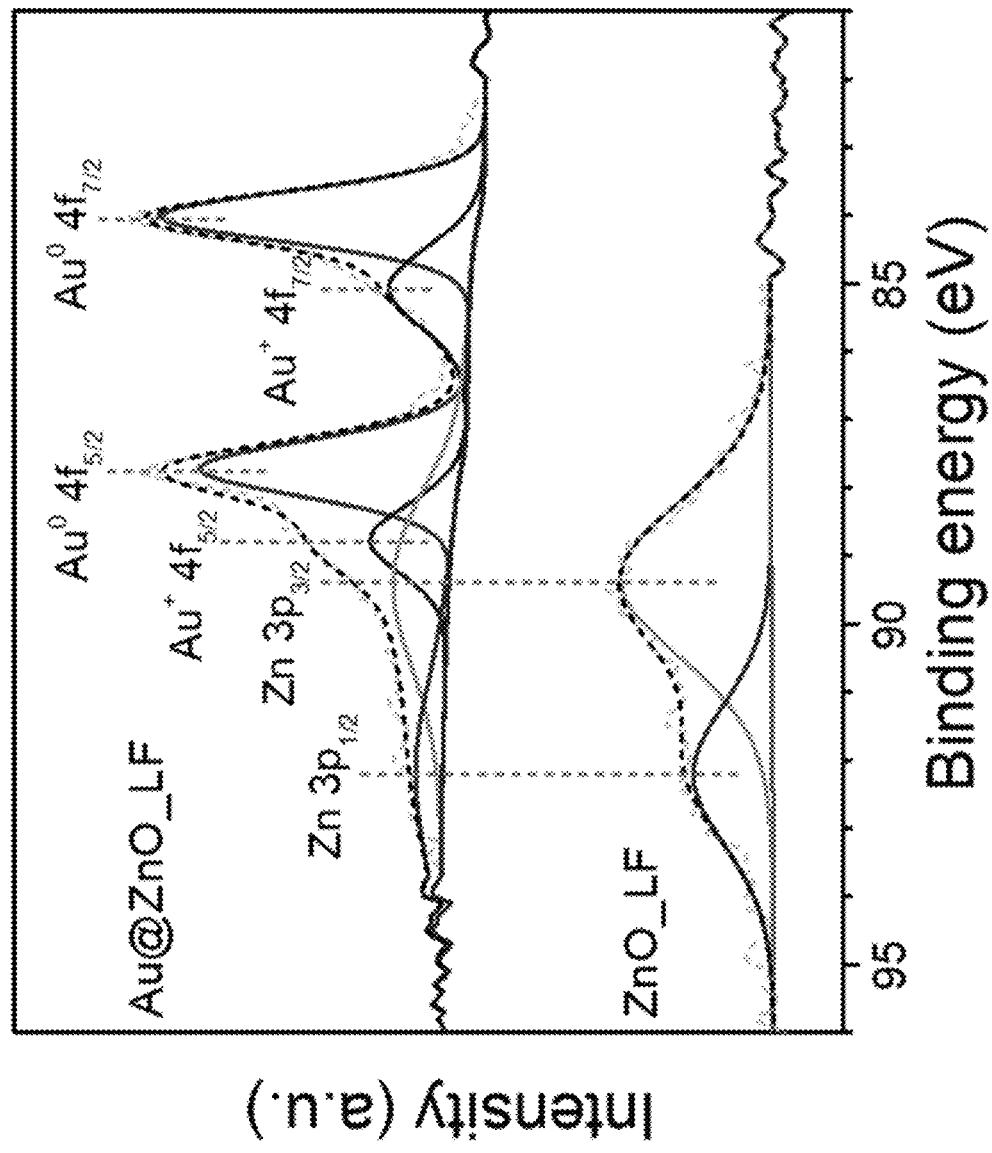
FIGS. 3C and 3D are high-resolution XPS spectra of Au 4f and O 1s, respectively.
Figure 3D:
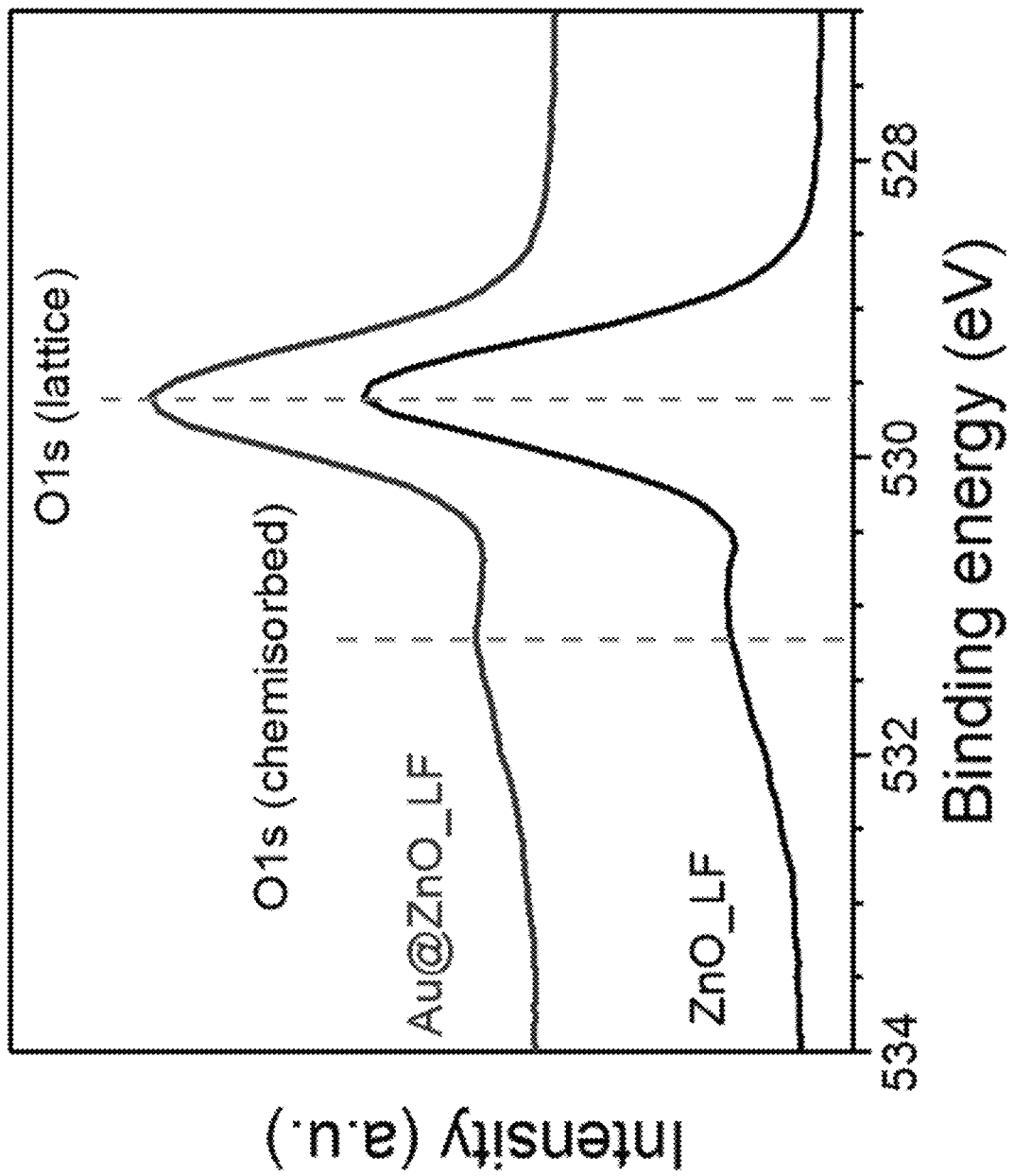

Particle migration and coalescence (PMC) can be inhibited by enhancing the metal support interaction (MSI), which is influenced by the atomic structure and chemical potential at the surface of the support. The strength of MSI between Au NPs and ZnO nanowires was evaluated with TEM and X-ray photoelectron spectrometry (XPS). The TEM image shows no sign of ZnO encapsulation or Au NPs sinking as reported in strong MSI (FIG. 3A). The high-resolution image (FIG. 3B) reveals the poor wetting of Au on ZnO nanowire with high contact angles around 130-135°. Moreover, a (111) growth direction was identified for the Au NPs supported on ZnO nanowires. This aligns well with the XRD pattern of Au@ZnO_LB, where only an Au (111) peak is identified. The growth direction of Au NPs supported on ZnO_S film is also (111). Strong MSI between Au and ZnO may also be reflected by the formation of $Au^{3+}$ at the interface due to high level of electron transfer. As shown in the high-resolution XPS spectra obtained from Au doped ZnO_LB film (FIGS. 3C and 3D), the deconvolution of the $Au\ 4f_{7/2}$ peak yields only metallic Au at 84 eV and $Au^+$ at 85.1 eV.

Another way to stop PMC is by introducing potential barriers on the path of diffusion with topographic features (e.g. hill and valleys) on the support surface. As summarized in Table 1, the surface of ZnO_S film is smoother than ZnO_LB film. However, their surface energies are also different, and hence the deconvolution of the two sintering resistant factors (e.g., MSI and diffusion barrier) is still unachievable, despite the notable difference in Au NPs size between the two supports. This issue was addressed by performing Au annealing test on ZnO nanoplates with the same surface plane as that of ZnO_LB film but with a smooth surface ($R_a$=1.19 nm, in 0.2 $\mu m^2$). The mean diameter of Au NPs obtained with the same annealing treatment is 16.3 nm on ZnO NP, which is closer to ZnO_S film rather than that of ZnO_LB film. Therefore, the topographic features on the ZnO_LB film is believed to be the main inhibitor of Au NPs sintering and growth on ZnO support.

TABLE 1

Surface properties and sintering resistant performance of three different ZnO substrates

| Sample | Ra (nm) | Surface plane | Surface energy (J/m$^2$)[43] | Annealing condition | Mean diameter (nm) |
|---|---|---|---|---|---|
| ZnO LB film | 6.5* | <100> | 1.0 | 400° C. 24 h | 10.7 |
| ZnO_S film | 1.01 | (002) | 2.4 | 400° C. 24 h | 16.6 |
| ZnO NP | 1.19 | <100> | 1.0 | 400° C. 24 h | 16.3 |

At this stage, the mechanism of sintering inhibition of Au NPs on ZnO_LB film can be explained qualitatively. The ridges at both sides of the mesa introduce potential barriers on cross-nanowire migration of Au NPs because of the small curvature of the ridges as explained by the Gibbs Thompson equation $$\Delta E = k \times \gamma \times \Omega$$

where $\Delta E$ is the excess potential, k is the local curvature, $\gamma$ is the surface energy of Au, and $\Omega$ is the atomic volume of Au. Based on the mean field theory, the slower the particle diffusion, the lower the frequency of collision. Once Au NPs reach 10 nm in size, the collision was constraint to just along the ZnO nanowire, which means that the collision chance becomes much lower, and hence grain growth slows down to undetectable level. Attributed to improved sintering resistance, high dispersion of small Au NPs can be stabilized on the surface of ZnO_LB film.

Sensing performance evaluation for acetylene: Sensing devices prepared with ZnO_LB film and ZnO_S film were evaluated for acetylene ($C_2H_2$) detection. For ZnO_LB film decorated with Au NPs (Au@ZnO_LB), an annealing treatment at 400° C. for 40 h was employed prior to sensor testing to obtain a stable Au NPs size of around 11 nm. To obtain similar size and dispersion of Au NPs on ZnO_S film (Au@ZnO_S), the annealing treatment time was shortened to 12 h.

A home-built sensing performance evaluation system was used to evaluate the sensing performance. The sensors first achieved steady state in the gas chamber at a set temperature with 200 sccm air flow for 30 min. Then the gas stream was switched between air and $C_2H_2$ containing air periodically to test the sensing performances at $C_2H_2$ concentration ranging from 10 ppb to 25 ppm. The more than 3 orders of magnitude change in $C_2H_2$ was obtained with a two-stage dilution system. The sensors were also tested in atmosphere containing typical interference gases, i.e. $H_2$, CO, and $CH_4$. Humidity in the gas stream was controlled by flowing dry air through a bubbler, the temperature of which was maintained at 25° C. by a water bath. Sensor response (S) was defined as the ratio between the electrical resistance in air (Rain) and the electrical resistance in reducing gas containing air ($R_{gas}$), i.e., S=$R_{gas}/R_{air}$. The response time and recovery time were defined as the time required to reach 90% of the full response state in mixed gas and 90% of the fully relaxed state in the air, respectively.

Figure 4:
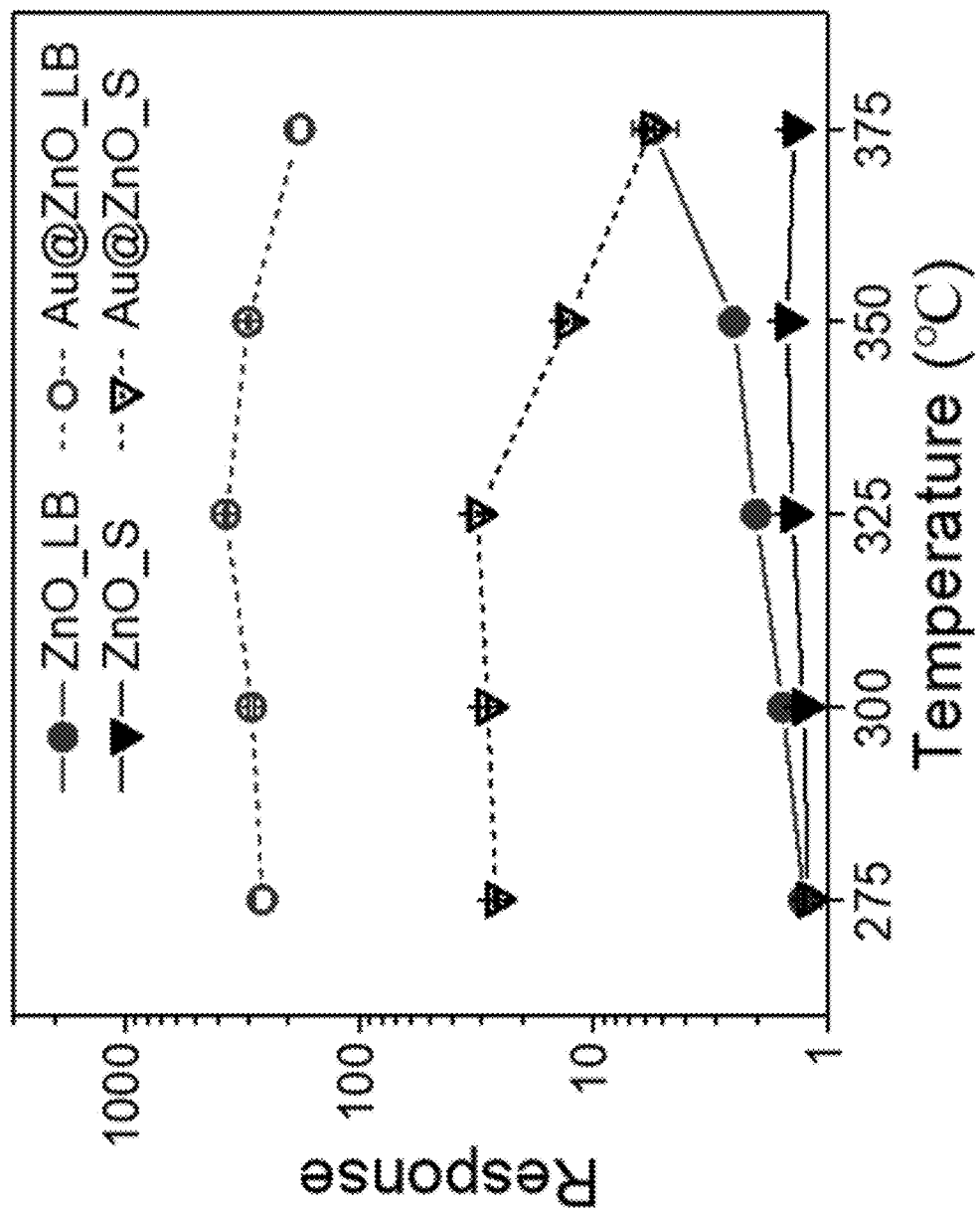
FIG. 4 shows response values towards 25 ppm of $C_2H_2$ at different operating temperatures.

To investigate the gas sensing properties and identify the optimum sensor working condition, the dynamic response of the pristine and Au NPs-doped ZnO thin film sensors upon exposure to 25 ppm of $C_2H_2$ was measured at a temperature range between 275 and 375° C. As shown in FIG. 4, ZnO_LB possesses higher response value than ZnO_S (e.g., 5.8 vs. 1.4 at 375° C.). In addition to response, the electrical resistance of ZnO_LB in clean air is also greater than that of ZnO_S by more than 3 orders of magnitude (Table 2). These phenomena could be explained by the difference in transducing mechanism: the grain boundary model applicable to ZnO_LB is more sensitive and resistive than the surface-bulk model of ZnO_S. The Langmuir-Blodgett film structure also possesses notably shorter response (46 vs 128 sec) and recovery time (190 vs 253 sec) than conventional thin films. A possible explanation is that microcracks, which only permit slow surface diffusion of gas species, exist within ZnO_S, and hence prolong the time required to achieve steady-state for the ZnO_S sensor.

With the loading of Au NPs on the surface of ZnO thin film sensors, the response values towards $C_2H_2$ increased by more than 180 and 20 times for ZnO_LB film and ZnO_S film, respectively. Moreover, the operating temperatures for the maximum response have also decreased from 375° C. to 325° C. because of Au doping. This indicates that Au NPs are an effective catalyst for the surface reaction, which serves to enhance the reaction kinetics at lower temperature. As shown in Table 2, Au loading also significantly affects other aspects of gas sensing properties. With the addition of Au NPs, the resistance values in clean air increase by around 60 and 30 times for Au@ZnO_LB and Au@ZnO_S, respectively. The addition of Au NPs also dramatically shortens the response time by 10 and 6 times for Au@ZnO_LB and Au@ZnO_S, respectively, because Au as a catalyst can lower the activation energy of the $C_2H_2$ oxidation reaction, and in turn, increase the reaction rate. As for the recovery process, which entails the re-adsorption of oxygen, re-trapping of free electrons, and desorption of the products of the oxidation reaction, is expedited by loading Au on ZnO_S, but prolonged by loading Au on ZnO_LB.

TABLE 2

Key sensing parameters other than response measured at 325° C. towards 25 ppm of $C_2H_2$.

| Sample | $R_{air}$ (Ω) | Response time (sec) | Recovery time (sec) |
|---|---|---|---|
| ZnO_LB | (1.39 ± 0.02) × 10$^7$ | 46 ± 1 | 190 ± 30 |
| ZnO_S | (6.4 ± 0.3) × 10$^3$ | 128 ± 1 | 253 ± 6 |
| Au@ZnO_LB | (8.4 ± 0.1) × 10$^8$ | 5.1 ± 0.4 | 320 ± 10 |
| Au@ZnO_S | (2.08 ± 0.08) × 10$^5$ | 19.6 ± 0.7 | 31.6 ± 0.3 |

Figure 5A:
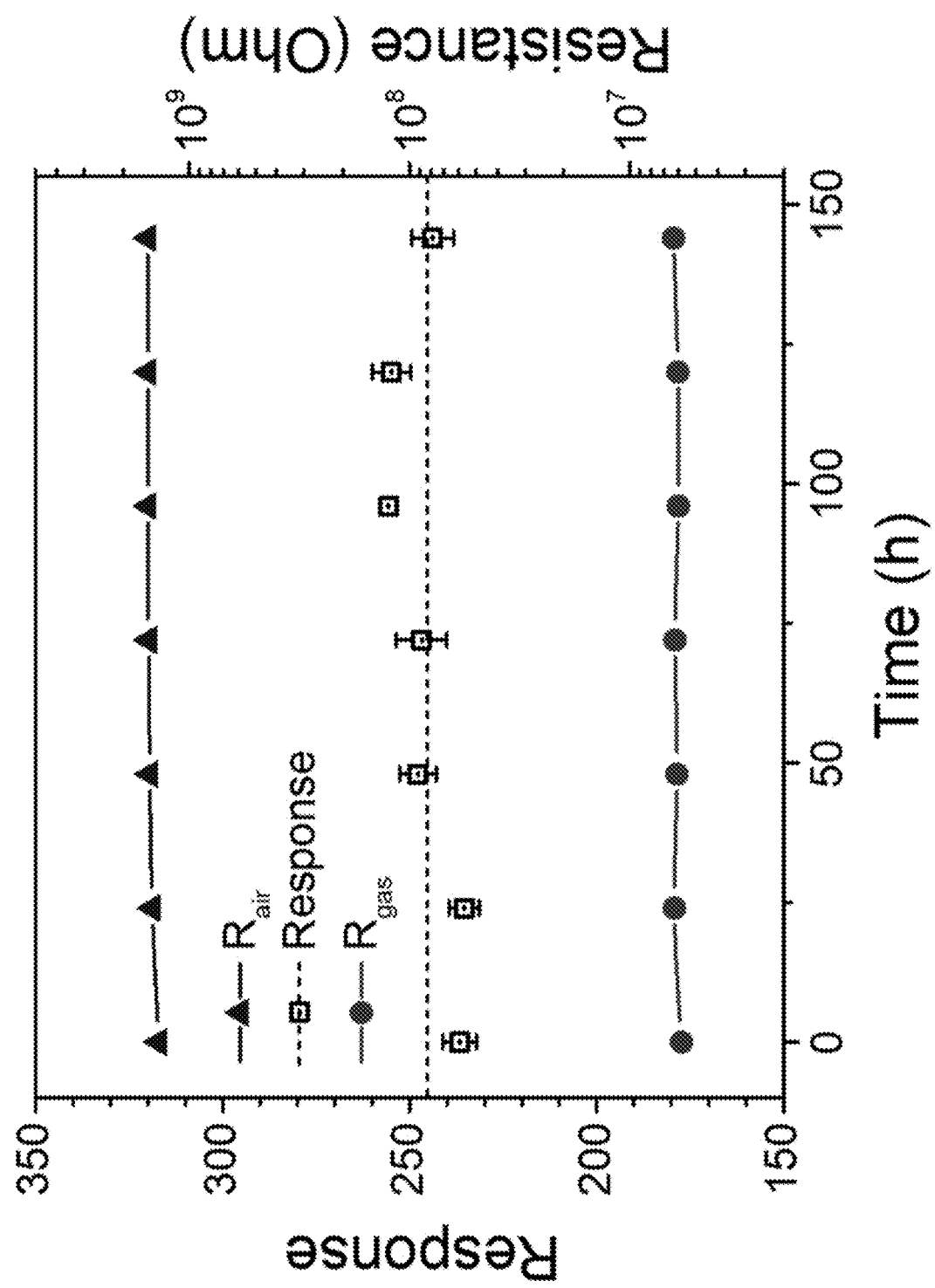
FIGS. 5A and 5B shows sensor stability test results gathered from Au@ZnO_LB and Au@ZnO_S, respectively. The sensors were exposed to 10 ppm (25 ppm for Au@ZnO_S) of $C_2H_2$ at the optimum operating temperature (325° C.) and the response was recorded 5 times per day for 1 week. Between each day's testing, the sensor was soaked in reducing condition (10/25 ppm $C_2H_2$, 325° C.) to accelerate the aging process.
Figure 5B:
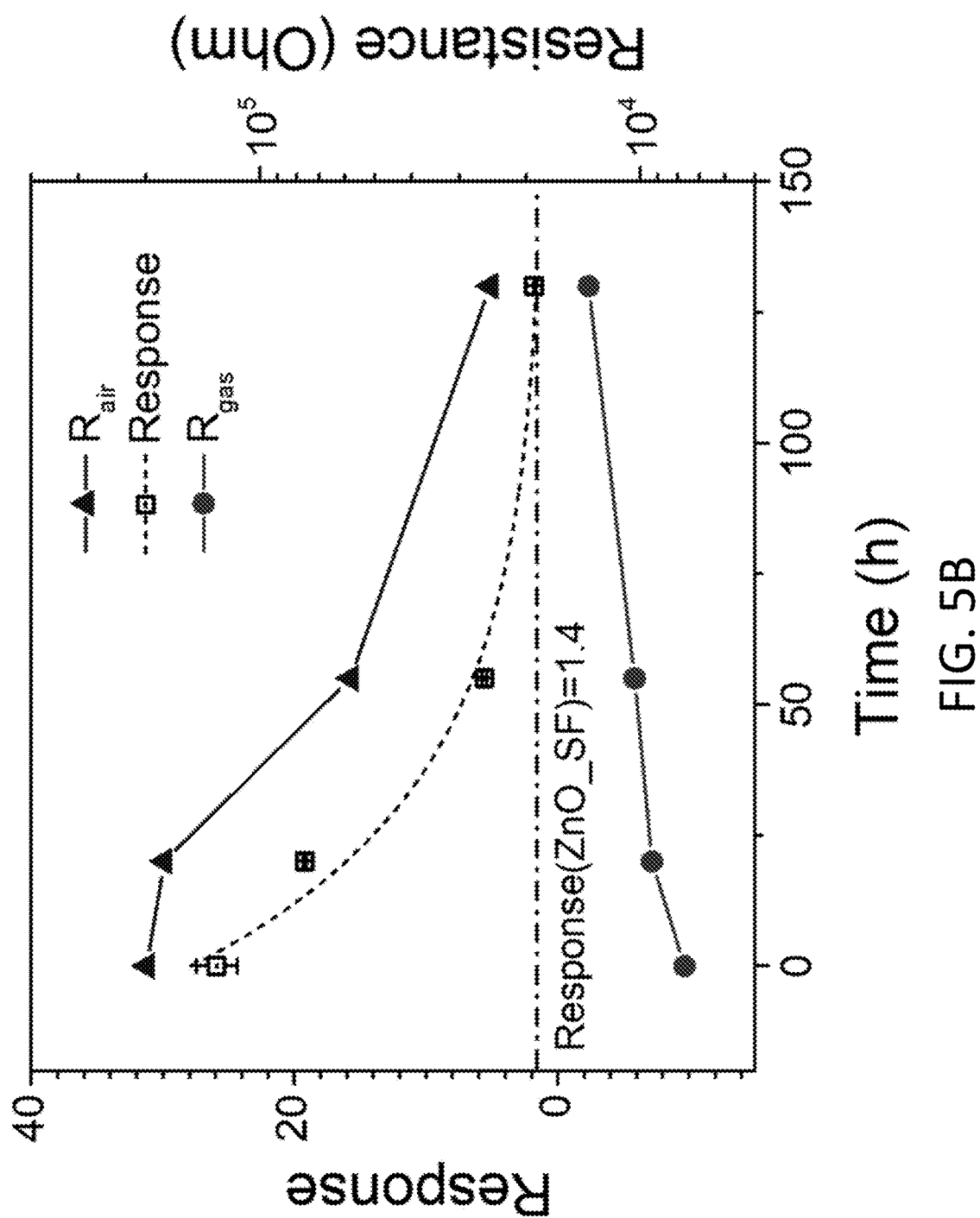

To evaluate the temporal stability of Au@ZnO_LB and Au@ZnO_S, the sensors were exposed to 10 ppm (25 ppm for Au@ZnO_S) of $C_2H_2$ at the optimum operating temperature (325° C.) and the response values were recorded 5 times per day for 1 week. Between each day's testing, the sensor was soaked in condition same as the testing condition (10/25 ppm $C_2H_2$, 325° C.) to accelerate the aging process. As shown in FIG. 5A, the response value as well as resistances in standby ($R_{air}$) and testing mode ($R_{gas}$) remained stable during the whole stability test for Au@ZnO_LB. On the other hand, for Au@ZnO_S, fast deterioration of response from 26 at the beginning of the test to 1.8 in 130 hours, a value close to the response recorded with pristine ZnO_S, was observed as shown in FIG. 5B. Along with diminishing response, the $R_{air}$ and $R_{gas}$ also varied significantly with time. It was revealed with SEM that the Au NPs supported on ZnO_S film grew from 11 nm to 17 nm during the stability test, causing the reduction in Au catalyst reactivity, and in turn, leading to severe decrease in the sensitization effectiveness. This discrepancy in operating stability signifies the advantage of ZnO_LB film over ZnO_S film in the prevention of Au NPs sintering and growth.

Figure 6A:
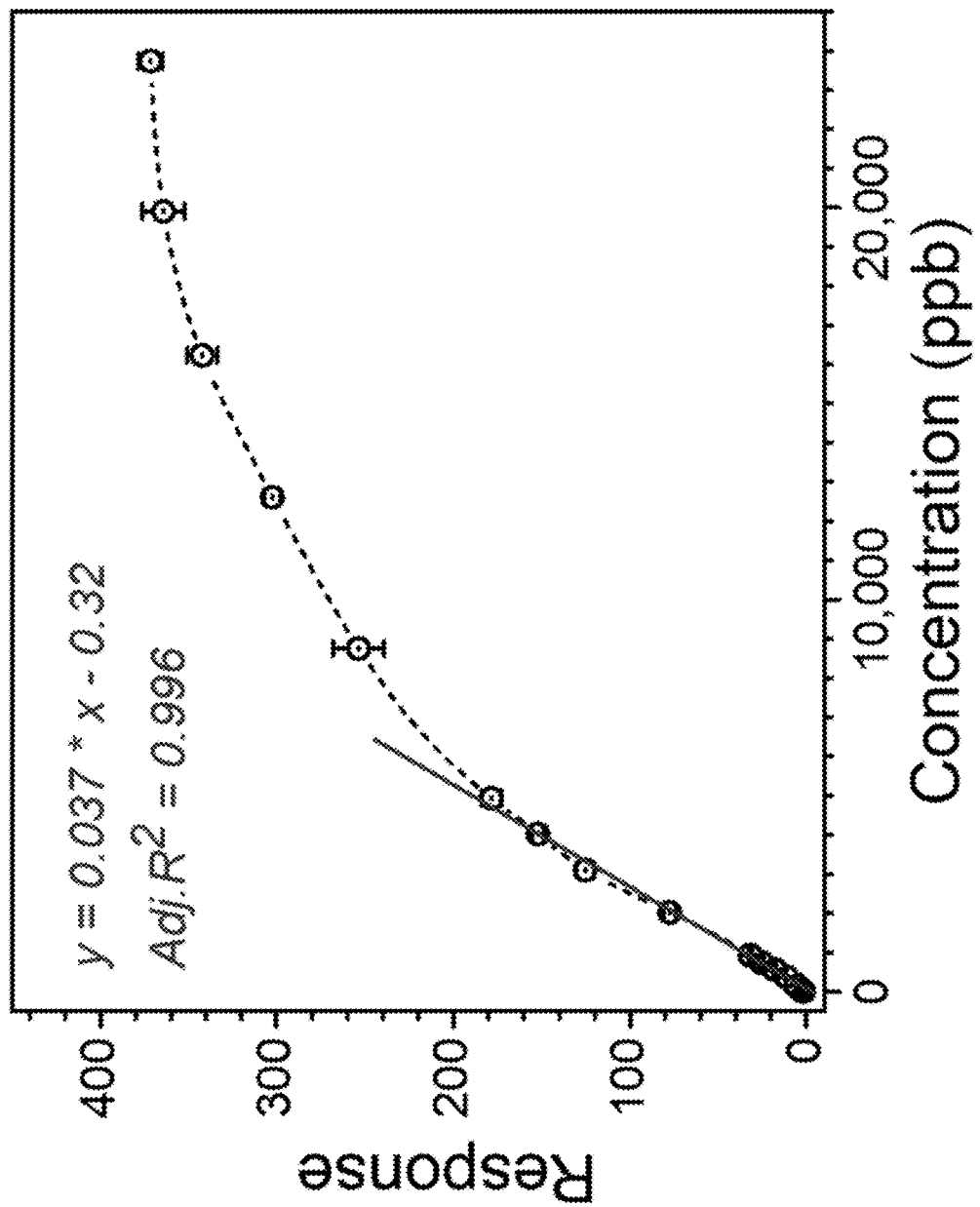
FIG. 6A shows a characteristic curve of Au@ZnO_LB obtained at the optimal working condition with linear response observed between 10-5000 ppb.
Figure 6B:
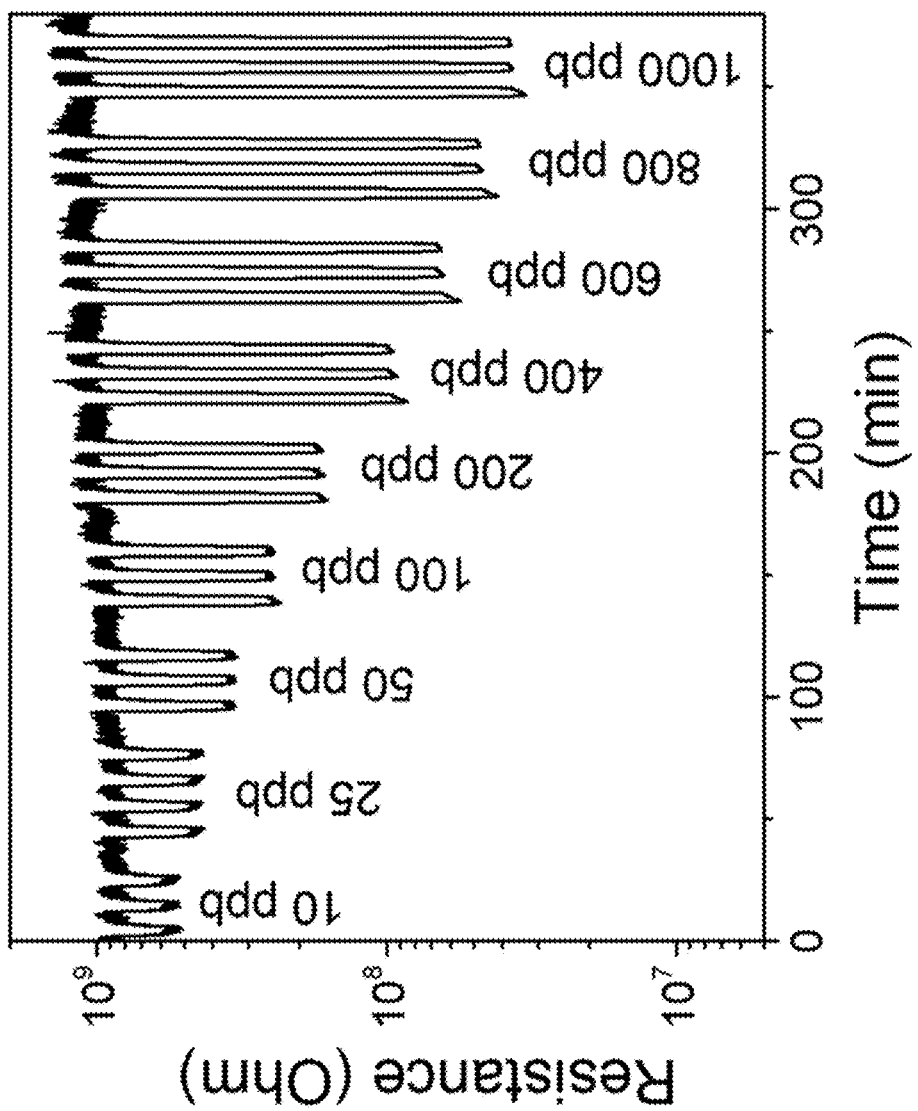
FIG. 6B shows a transient response curve towards 10-1000 ppb of $C_2H_2$.
Figure 6C:
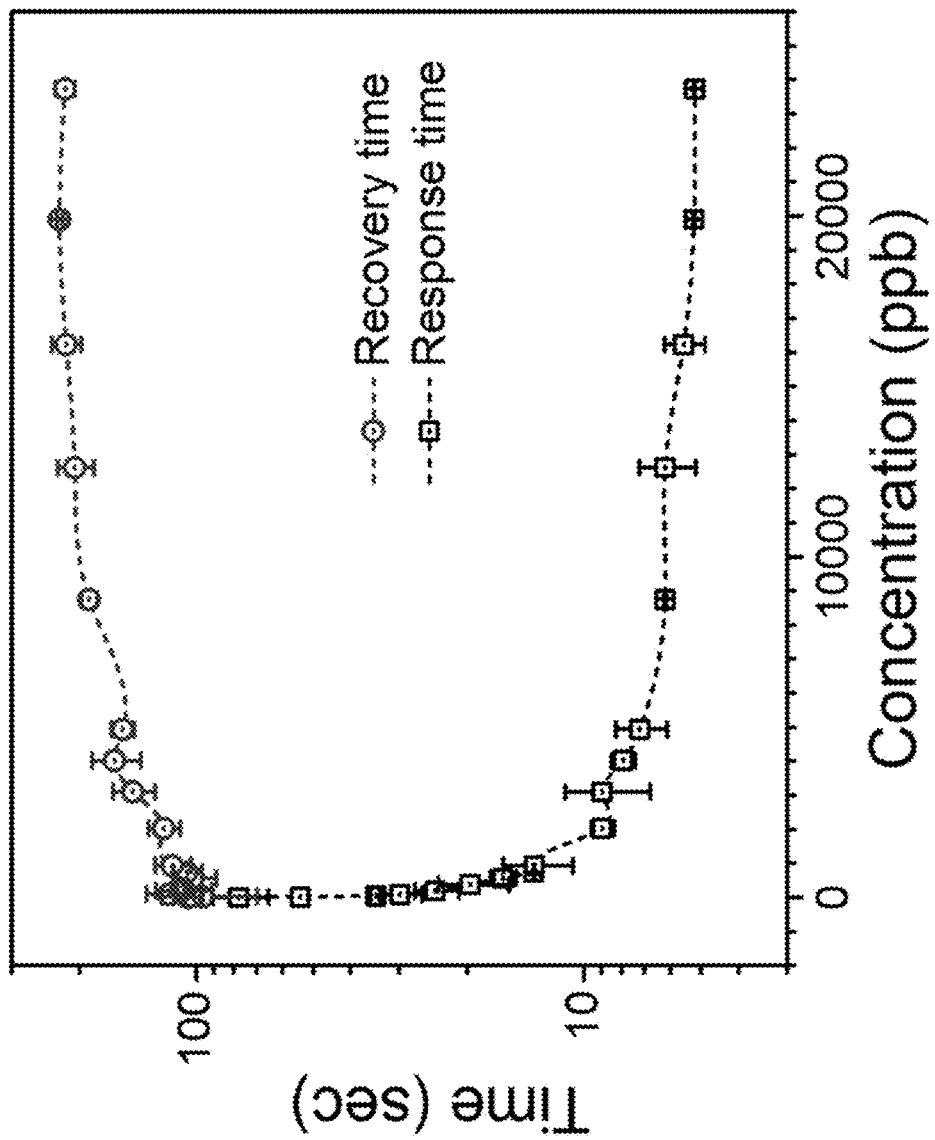
FIG. 6C shows response and recovery time variations as a function of concentration.

The performance of Au@ZnO_LB sensor, which displays the best sensing properties among the four sensors, was examined at its optimal operating condition as a promising $C_2H_2$ sensor for air quality monitoring application. Because the concentration of $C_2H_2$ in an outdoor and indoor environment is in ppb-level, the sensor was exposed to 10-25,000 ppb of $C_2H_2$ at 325° C. to record the characteristic curve, which is displayed in FIG. 6A. Initially, the response increases rapidly in a highly linear fashion with increasing $C_2H_2$ concentration from 1.7 at 10 ppb to 178 at 5000 ppb. The sensitivity towards $C_2H_2$ in ppb range was thus derived from the slope of this linear region to be around 37 ppm'. At concentrations higher than 5000 ppb, the rate of rise gradually decreased until reaching saturation at 25,000 ppb. The dynamic response to 10-1000 ppb of $C_2H_2$ is displayed in the inset of FIG. 6A. At least three repetitions were made at each concentration, demonstrating the good reproducibility of the sensor response. The response and recovery time as a function of concentration are demonstrated in FIG. 6C. The response time drops from 77 sec at 10 ppb to 20 sec at 400 ppb, then decreases to 5 sec at 25,000 ppb. The recovery time on the other hand increases with concentration and approach a plateau value of around 200 sec at a slower rate. In the concentration range of interest for air quality monitoring (i.e., 1-1000 ppb), the response time is around 13-20 sec, and recovery time is around 100 sec.

Figure 6D:
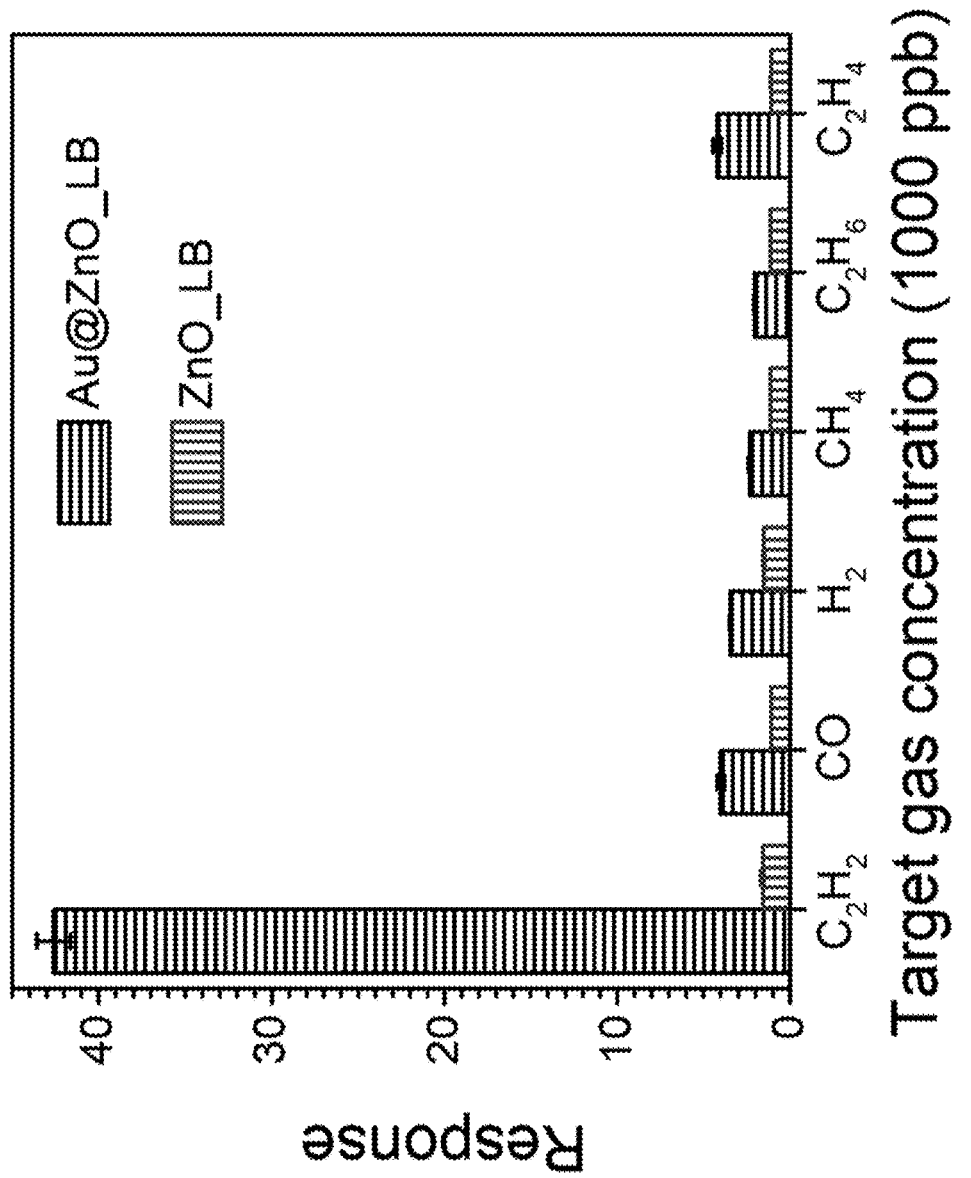
FIG. 6D show selectivity towards $C_2H_2$ over other gases with and without Au dopant on ZnO_LB.
Figure 6E:
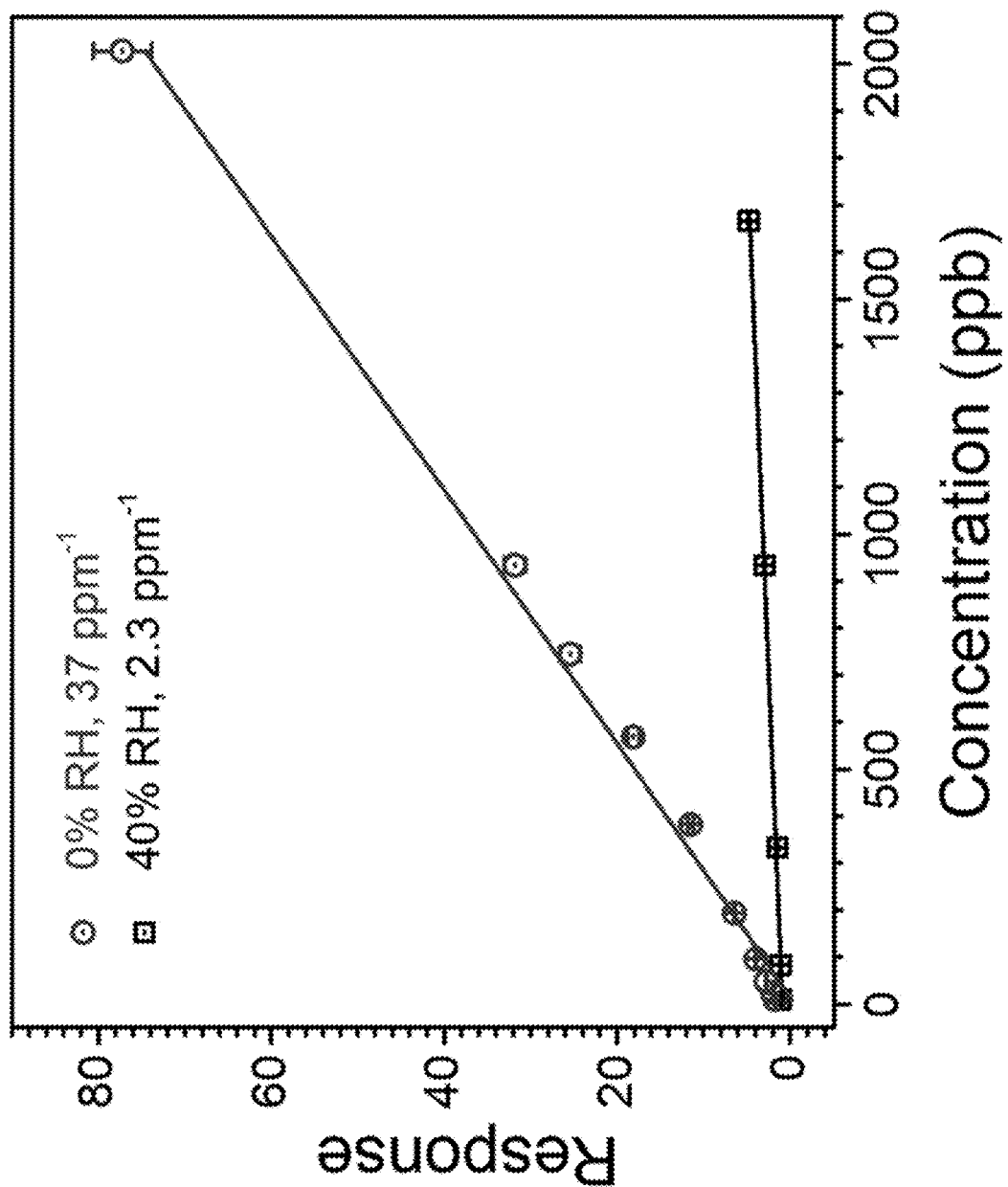
FIG. 6E shows the effect of 40% relative humidity on the sensitivity of Au@ZnO_LB.
Figure 6F:
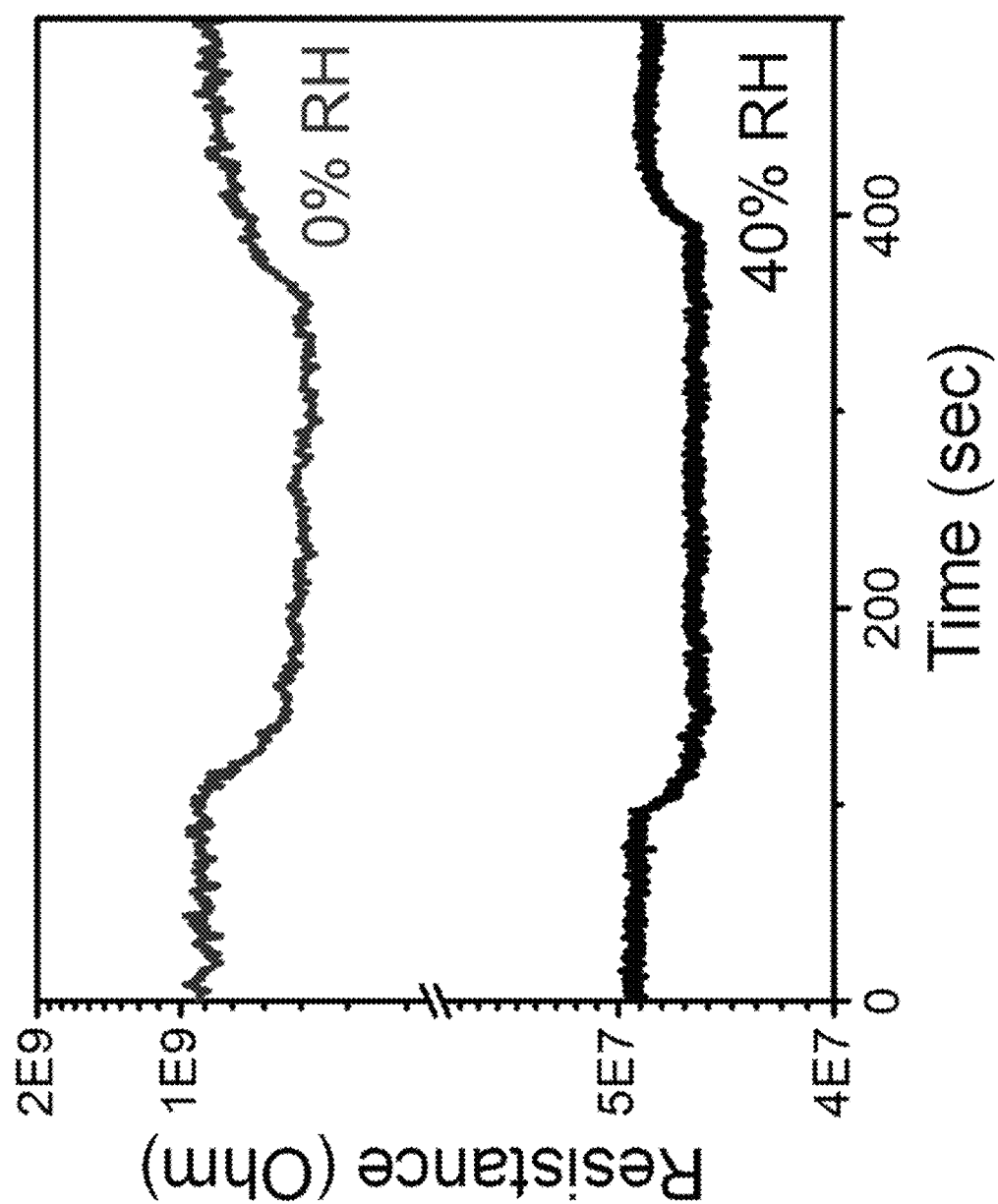
FIG. 6F shows a transient response curve towards 10 ppb of $C_2H_2$ obtained under dry and humid conditions.

FIG. 6D shows the response of the Au@ZnO_LB sensor to common interference gases from the testing environment including carbon monoxide (CO), hydrogen ($H_2$), methane ($CH_4$), ethane (CAL), and ethylene ($C_2H_4$). A much higher selectivity to $C_2H_2$ can be observed in comparison to the pristine ZnO_LB. The effect of humidity on $C_2H_2$ sensing properties was also analyzed. As illustrated in FIG. 6E, a significant drop in sensitivity from 37 in dry condition to 2.3 ppm$^{-1}$ was observed under 40% RH. The change of dynamic resistance towards 10 ppb of $C_2H_2$ under dry and wet condition was illustrated in the inset of FIG. 6F. A still discernable signal of 1.07 towards this low concentration of analyte gas was obtained under humid condition. The dramatic drop in $R_{air}$ under humid condition conforms to the oxygen-water vapor interplay theory. Moreover, with increasing humidity, the response and recovery time also shortened from 70 to 35 sec and 100 to 25 sec, respectively.

The investigation on the mechanisms of surface reaction and electrical conduction were furthered to explain the improvement on the sensitivity towards $C_2H_2$ achieved by loading Au NPs. It can be observed experimentally that the sensor response is well correlated with the partial pressure of target gas of interest, PA, by the following equation:

Response=$a*P_A^n$ where the proportionality constant a increases with decreasing $D/x_0$ ratio (D: diameter of the grain; $x_0$: depletion layer width), and the exponent factor n is mainly dictated by the type of ionized oxygen species (molecular or atomic) and the reaction order of PA in the surface reactions.

Figure 7A:
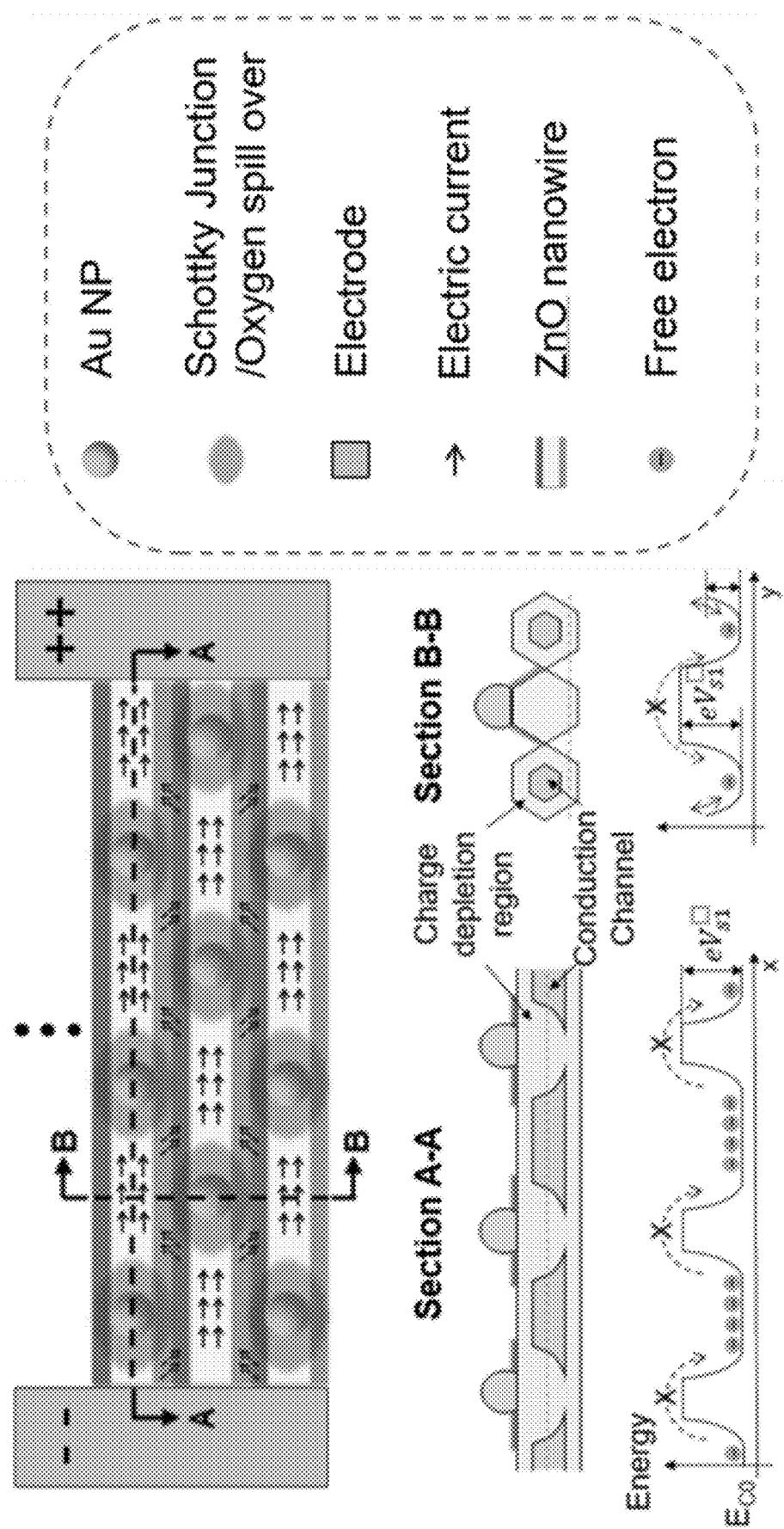
FIGS. 7A and 7B are schematics showing the electron conduction mechanism of Au@ZnO_LF in air and in reducing gas, respectively. In the air, the electron may only flow in a short distance along the nanowires within the conduction channel, before being forced to diverge from the high potential barrier $eV_{s0}$ in the fully depleted region to adjacent nanowires by overcoming a lower potential barrier $eV_{s0}$. In a reducing atmosphere, the consumption of oxygen species leads to reduced charge depletion depth. Electrons under bias may then flow freely through the conduction channel, and the sensor becomes much more conductive.
Figure 7B:
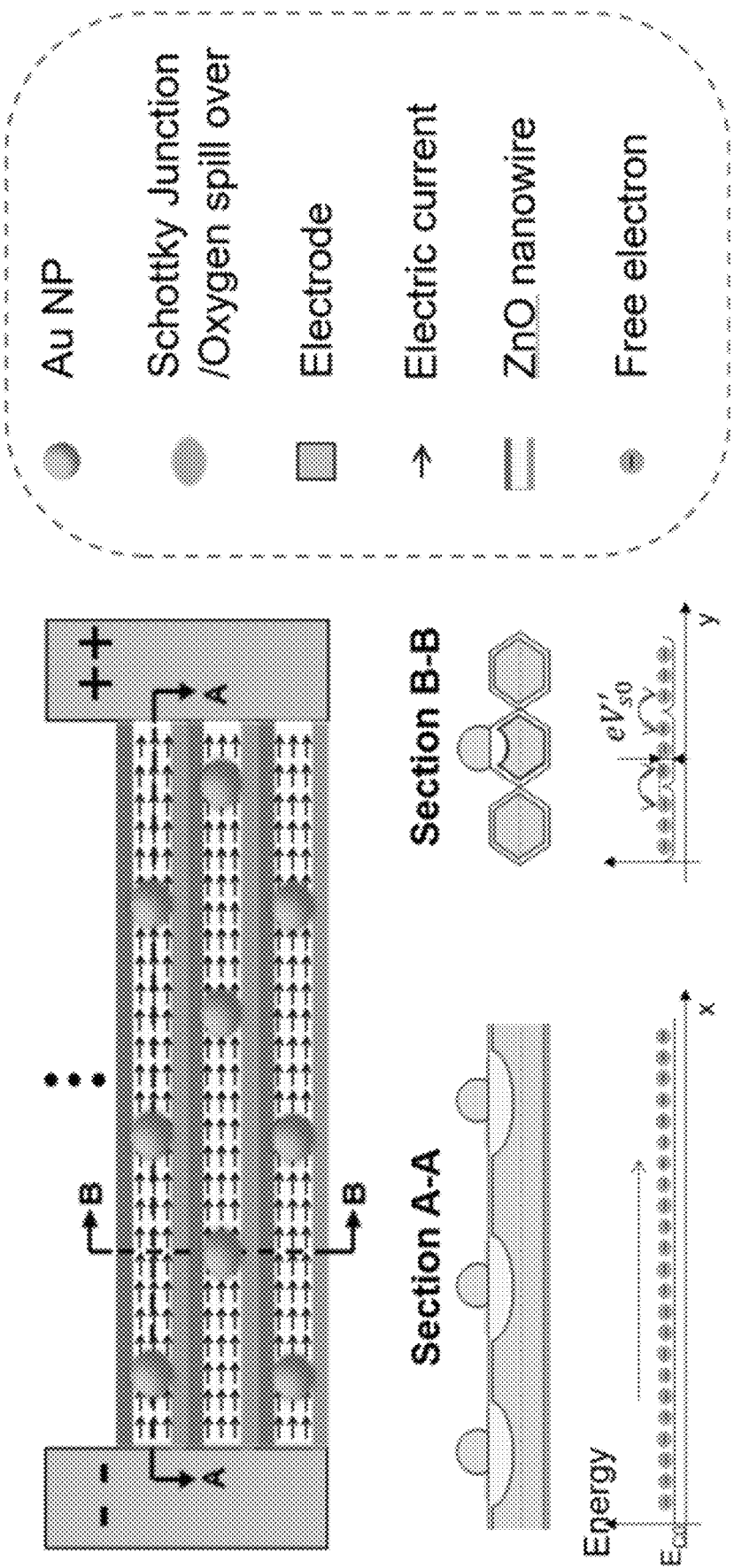

First, loading the Au NPs on ZnO films led to a notable increase in the baseline resistance of ZnO thin film (i.e. 60 and 30 times for ZnO_LB and ZnO_S, respectively). Because the Au NPs are isolated and only present at the top surface of the sensing film, the increase in the baseline resistance can be attributed to the decrease of conductivity in the ZnO thin films underneath, which provide the main path for electron conduction. As illustrated in FIG. 7A, the transportation of electrons within the ZnO_LB film could be throttled due to the formation of deeper electron depletion layer (EDL) underneath the ZnO/Au contact. The expansion of EDL (decrease of D/x0) could arise from either the formation of Schottky junction between Au and ZnO, or by the oxygen spill-over effect of Au NPs. When the sensor is exposed to reducing gas (e.g., $C_2H_2$), the reducing gas molecules react with oxygen anions and release the electrons back to the conduction band, causing reduced charge depletion depth and thereby opens the conduction channel within the nanowire as shown in FIG. 7B. Electrons under bias may then flow freely through the conduction channel, and the sensor becomes much more conductive. As a result, a small gas concentration can then work like a switch closing or opening the conducting channel of ZnO nanowires, leading to tremendous sensor response.

Second, the exponent factor n is sensitive to the change in the reaction order of the surface reaction, which is affected by the degree of coverage achieved by a reactant for a surface-catalyzed reaction. Considering the most frequently proposed reaction scheme for reducing gas detection with semiconducting metal oxides, involving the total oxidation of reducing gas by one predominant type of ionosorbed oxygen species via a Langmuir-Hinshelwood mechanism, the following quasi-chemical reactions are proposed for $C_2H_2$:

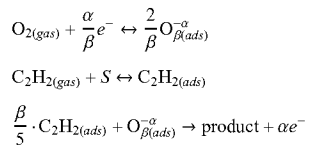

Figure 8:
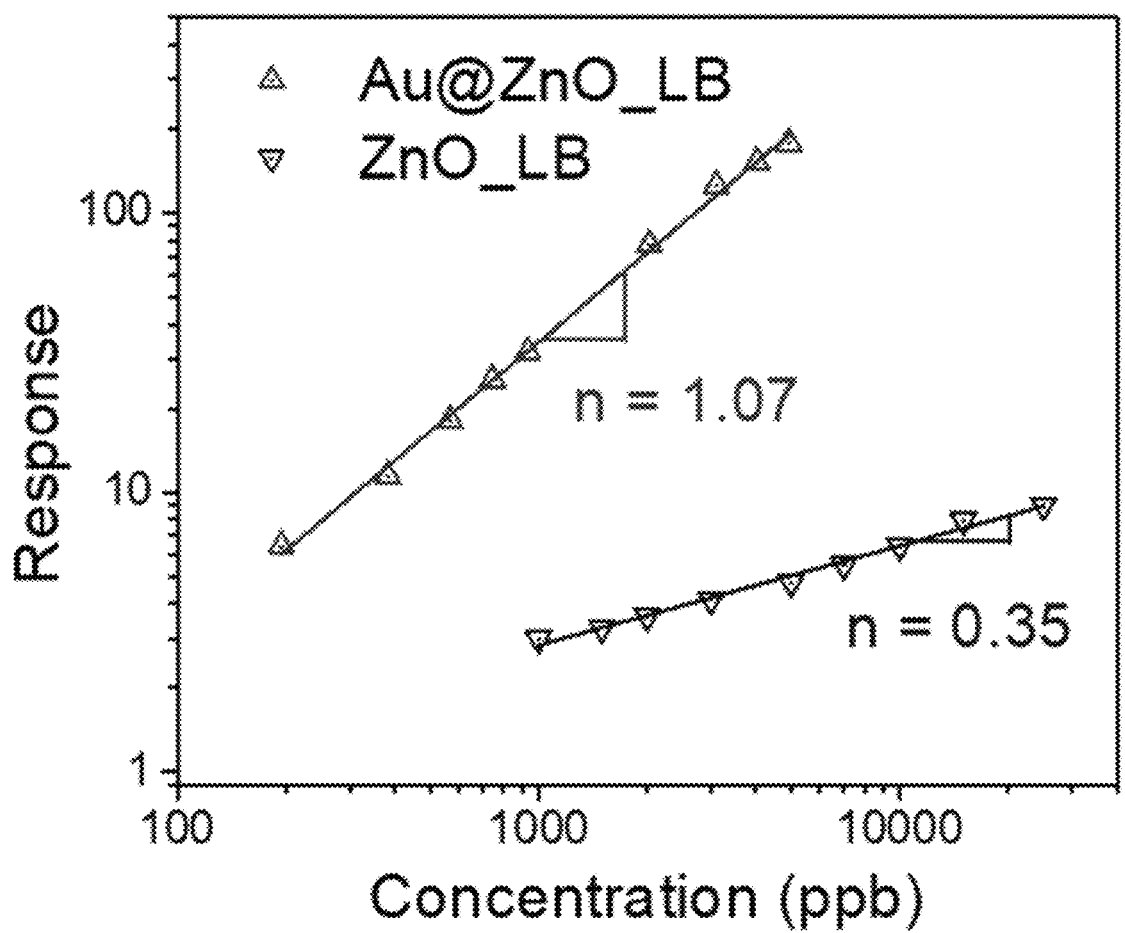
FIG. 8 shows calibration curves towards acetylene plotted in log-log scale to reveal the exponent factor.

By considering the rate equation and space charge layer formation, the theoretical value of exponent factor n for sensing $C_2H_2$ gas can be easily deduced to be 0.4 when the predominant ionized oxygen species are $O^{2-}$, and 0.1 when the predominant oxygen anions are $O^-$. FIG. 8 shows that for the pristine ZnO_LB sample, the exponent factor matches the theoretical value for total oxidation with $O^{2-}$, while the Au doped sample has an exponent factor of 1, much higher than the theoretical values under the premise of complete oxidation. This indicates that the Au NPs might have altered the reaction order by changing the relative concentration of $C_2H_2$ to ionized oxygen on the ZnO surface by $C_2H_2$ spillover effect. The higher ratio of $C_2H_2$ to ionized oxygen should be more favorable to partial oxidation reaction, and hence the response becomes more sensitive to the concentration change of $C_2H_2$.

The selectivity of Au@ZnO_LB towards $C_2H_2$ can be explained at least in part by its strong and selective chemisorption on Au NPs at high temperature. $C_2H_2$ has been observed to adsorb strongly on the surface of noble metals, due to its high capacity as an electron donor.

Figure 9:
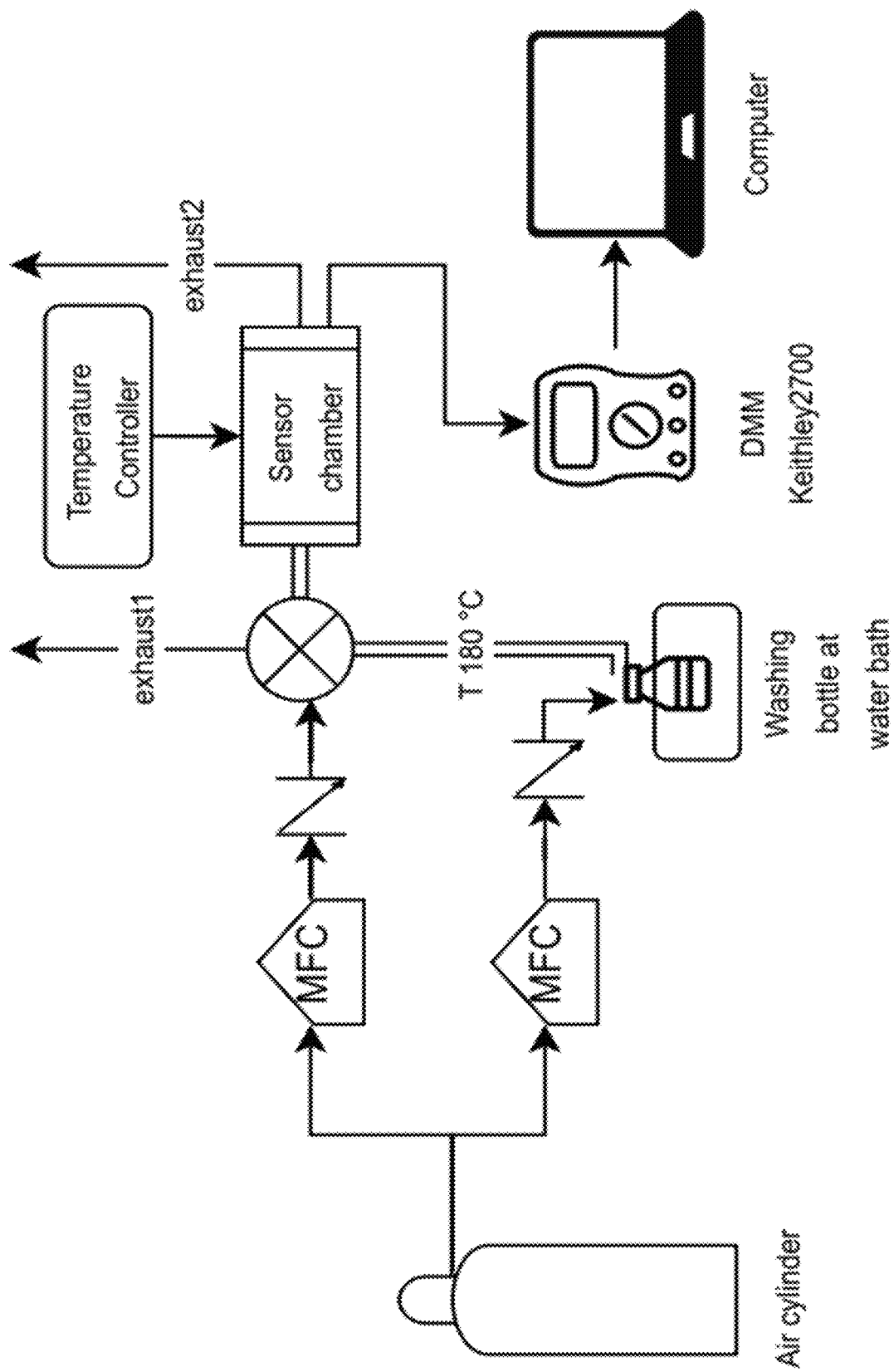
FIG. 9 is a schematic of the experimental setup employed to measure transient electrical responses of the nanostructured Au—ZnO sensor exposed to p-xylene.

Sensing performance evaluation for p-xylene: FIG. 9 shows a schematic of the equipment used in this work to measure transient response and recovery curves of p-xylene on metal-oxide sensors. An air stream containing p-xylene at controlled concentration was generated by passing air at a mass flow rate of 160 ml (STP)/min controlled by a mass flow controller (MKS, GM50A) through p-xylene filled sparger immersed in a water bath at 60° C. Calibration by collecting p-xylene in such generated air stream showed that the resulting air stream contained p-xylene at 0.95±0.04 mol %. A heating rope, coupled with a temperature controller (CN16PT-305, OMEGA), was used to keep the tubing temperature at 180° C. to avoid condensation of p-xylene during transport.

Pure air stream (reference gas) and p-xylene containing air stream (target gas) were sequentially fed into the sensor chamber of the test system. Cyclic switches between the reference gas stream and the target gas stream were realized with a four-way valve to produce a step function change of p-xylene concentration for the sensor. Transient resistance data were recorded using a digital multimeter (Keithley 2700) and a voltage source (Keithley 2400) with 5V applied, with help of a PC data acquisition system (GPIB interface). The resistance versus time data (transient response and recovery curves) of the sensor in response to a switch from the reference gas to the target gas and back to the reference gas, were recorded using the instrument control toolbox from MATLAB® R2020b.

Figure 10B:
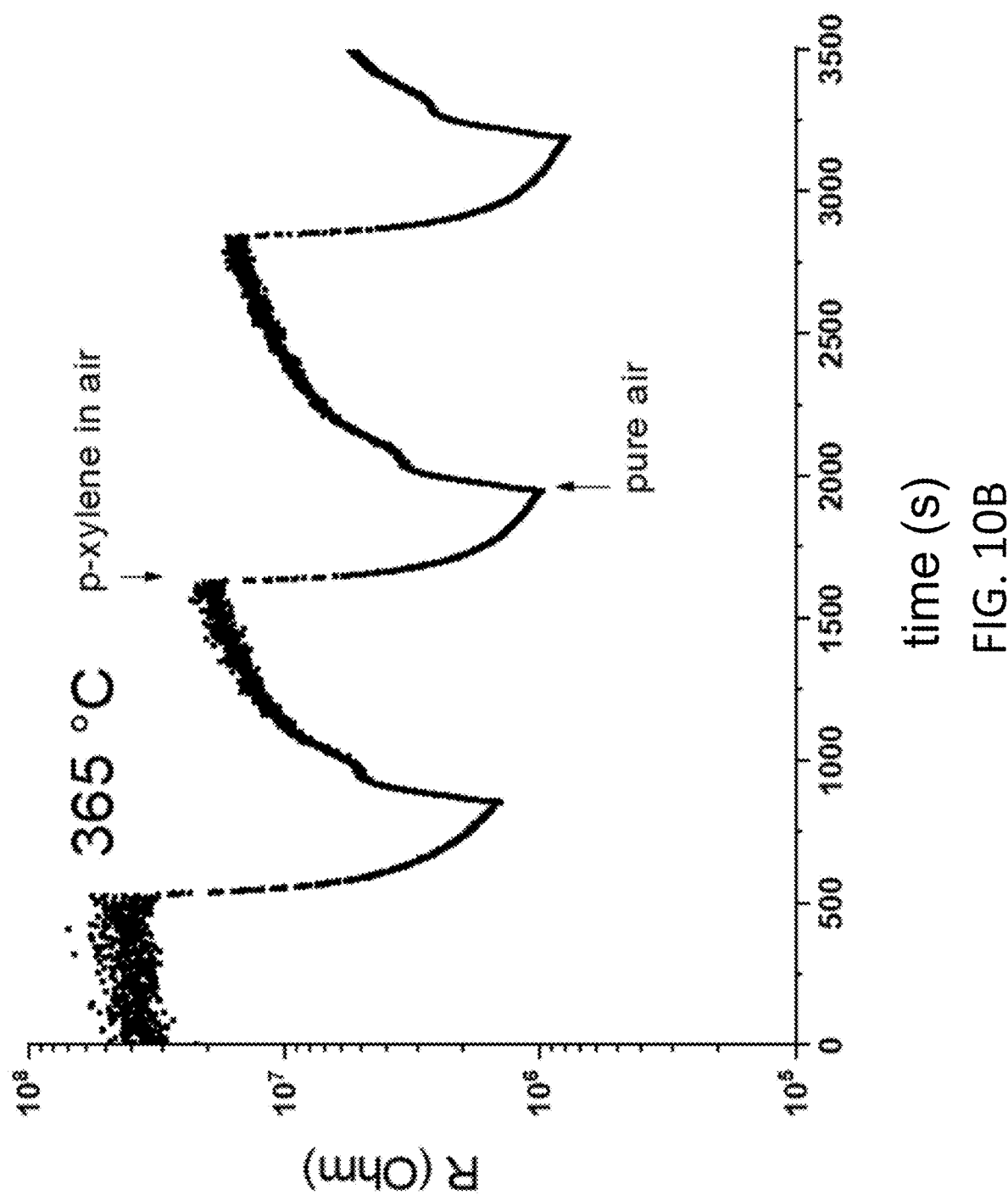
Figure 10C:
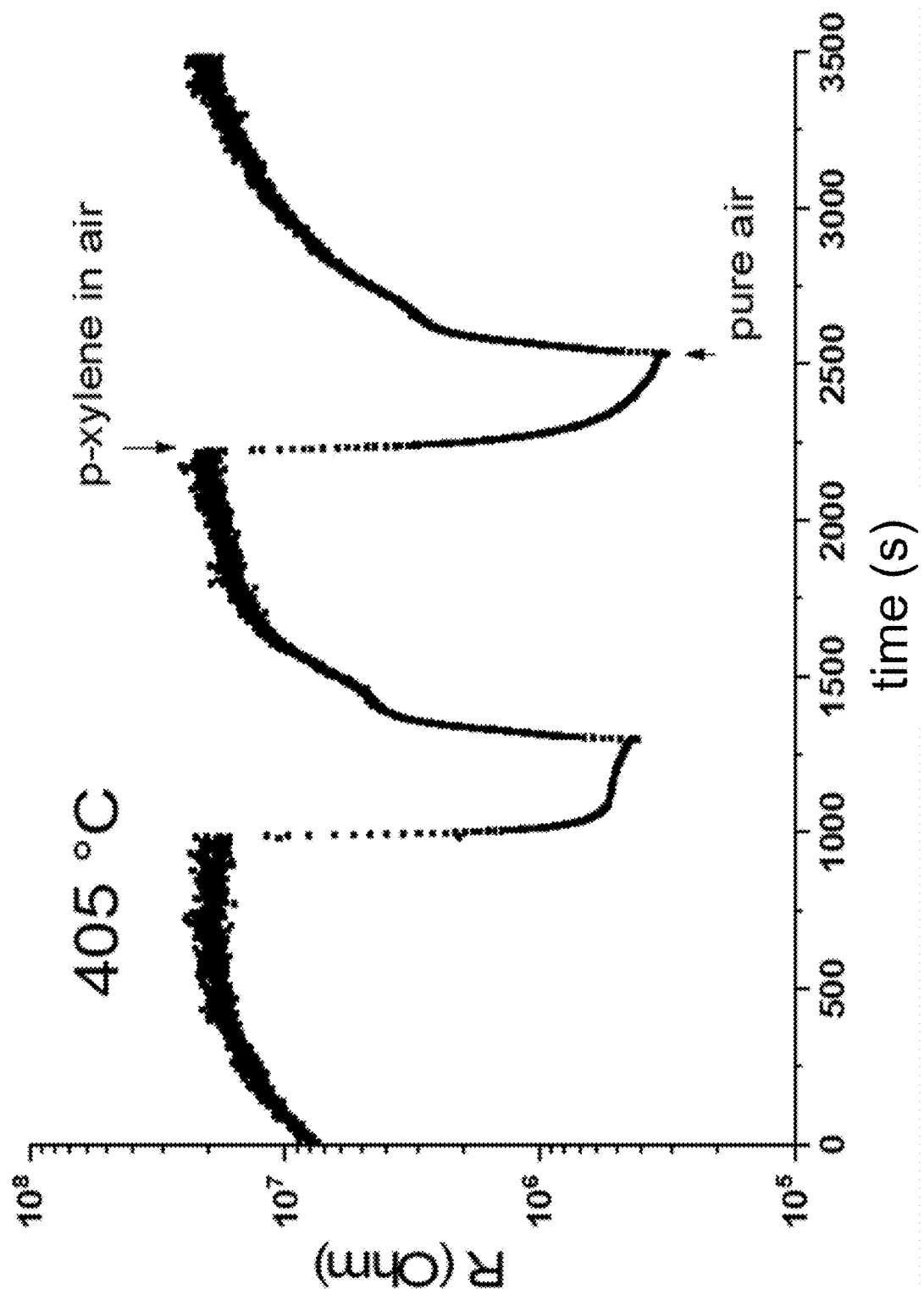

FIGS. 10A-10C show transient resistance changes of the Au—ZnO sensor in response to the switch of the flowing stream between pure air (reference gas) and air containing 0.959 mol % (~9590 ppm) p-xylene (target gas) (1 atm) at 325° C., 365° C., and 405° C., respectively. The equilibrium sensor response values, $R_{air}/R_{gas}$ ratio, are 1.88, 15.75, and 34.87 at the selected temperatures, respectively. Overall, the increase of temperature significantly improves the sensor response. In FIG. 10A, a small bump is observed immediately after the start point of the recovery region. Such behavior can be attributed to a sluggish desorption of the reaction products that can, in turn, delay the recapture of free electrons. No significant shift is observed in the sensor resistance when exposed to the reference gas. As the operating temperature increases, this peak faded completely.

A multiple step adsorption-desorption mechanism has been proposed to describe the kinetics for detecting an analyte gas on a metal oxide sensor as:

$$R + S \leftrightarrow R_{ad} \text{ (adsorption)} \qquad (A)$$

$$R_{ad} + O^-_{ad} \leftrightarrow RO_{ad} + e \text{ (charge transfer reaction)} \qquad (B)$$

$$RO_{ad} \leftrightarrow RO_{gas}\uparrow + S \text{ (desorption)} \qquad (C)$$

where R is the analyte gas (p-xylene in this work), S is the surface of metal oxide (Au—ZnO in this work), $O^-_{ad}$ is chemisorbed oxygen in the step of air purge, $RO_{ad}$ is chemisorbed analyte gas, and $RO_{gas}$ is the gas product form. The response step includes reactions (A) and (B) and since the electrical conductance G of the metal oxide sensor is proportional to the electron concentration [e], it is assumed that reaction (B) is in equilibrium which means that the conductance is proportional to the concentration of $R_{ad}$.

Thus, the transient conductance change, G(t), in the response step, would be related to the transient concentration of $[R_{ad}](t)$, which can be described by the Langmuir mono-layer adsorption kinetic. For the single-site adsorption, this leads to the following transient change of $[R_{ad}]$, expressed in G, for the response step:

where $t_{res}$ is the response time constant, $G_o$ is base conductance and the $\Delta G_1$ is the conductance gain after it reaches the steady state (t→∞). Similar equation can be obtained for recovery step as:

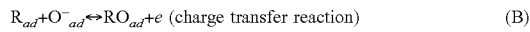

where $t_{rec}$ is the recovery time constant, $G'_o$ is the conductance after it reaches the steady state (t→∞), and $\Delta G'_1$ is the conductance change in the entire recovery step. The temperature dependence of time constants for the response and recovery steps is related to the energy barrier (activation energy) for adsorption or desorption following the Arrhenius type equation:

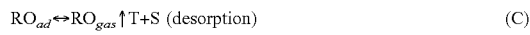

Figure 11A:
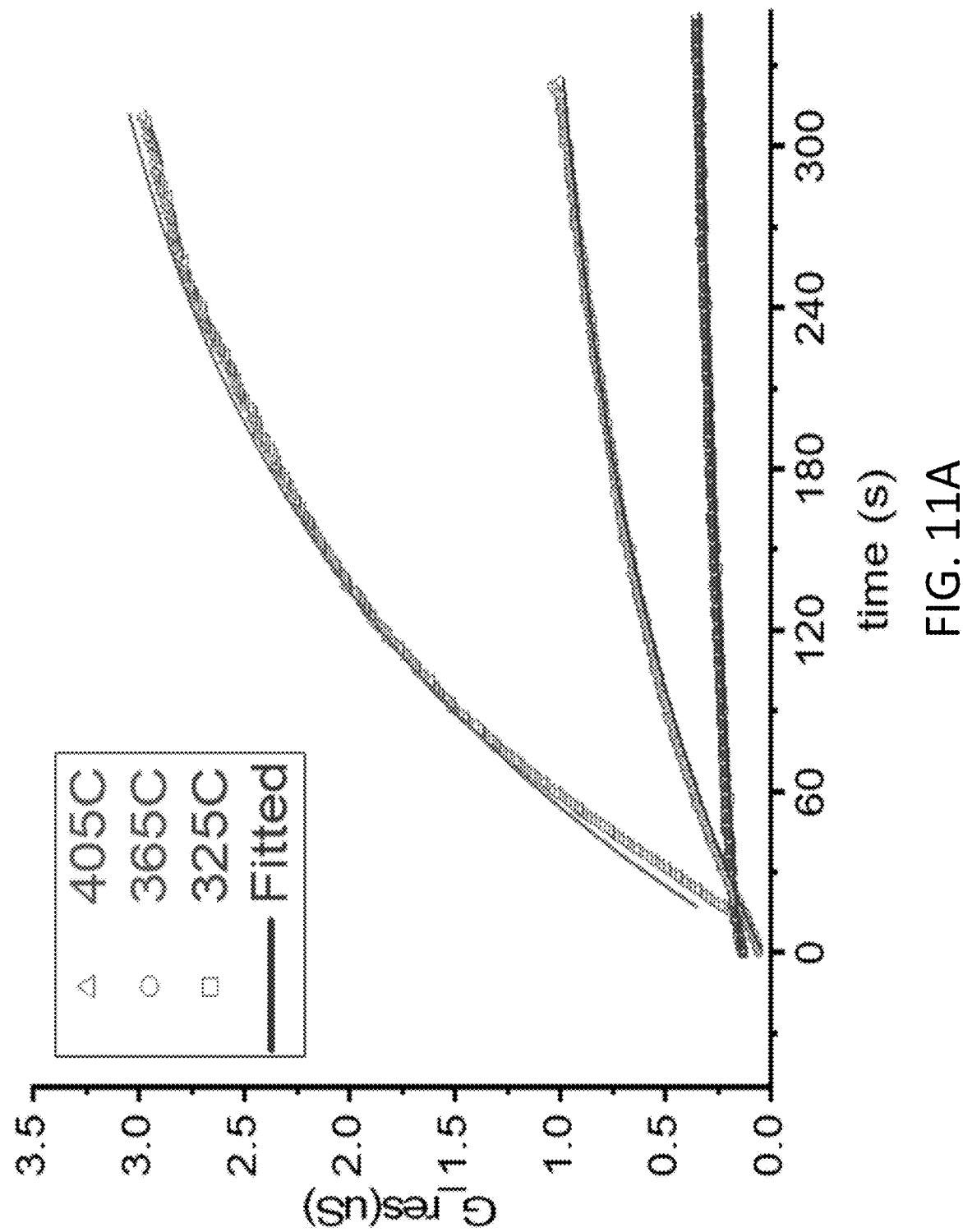
FIGS. 11A and 11B show transient response and recovery conductance curves, respectively, at different sensing temperatures.
Figure 11B:
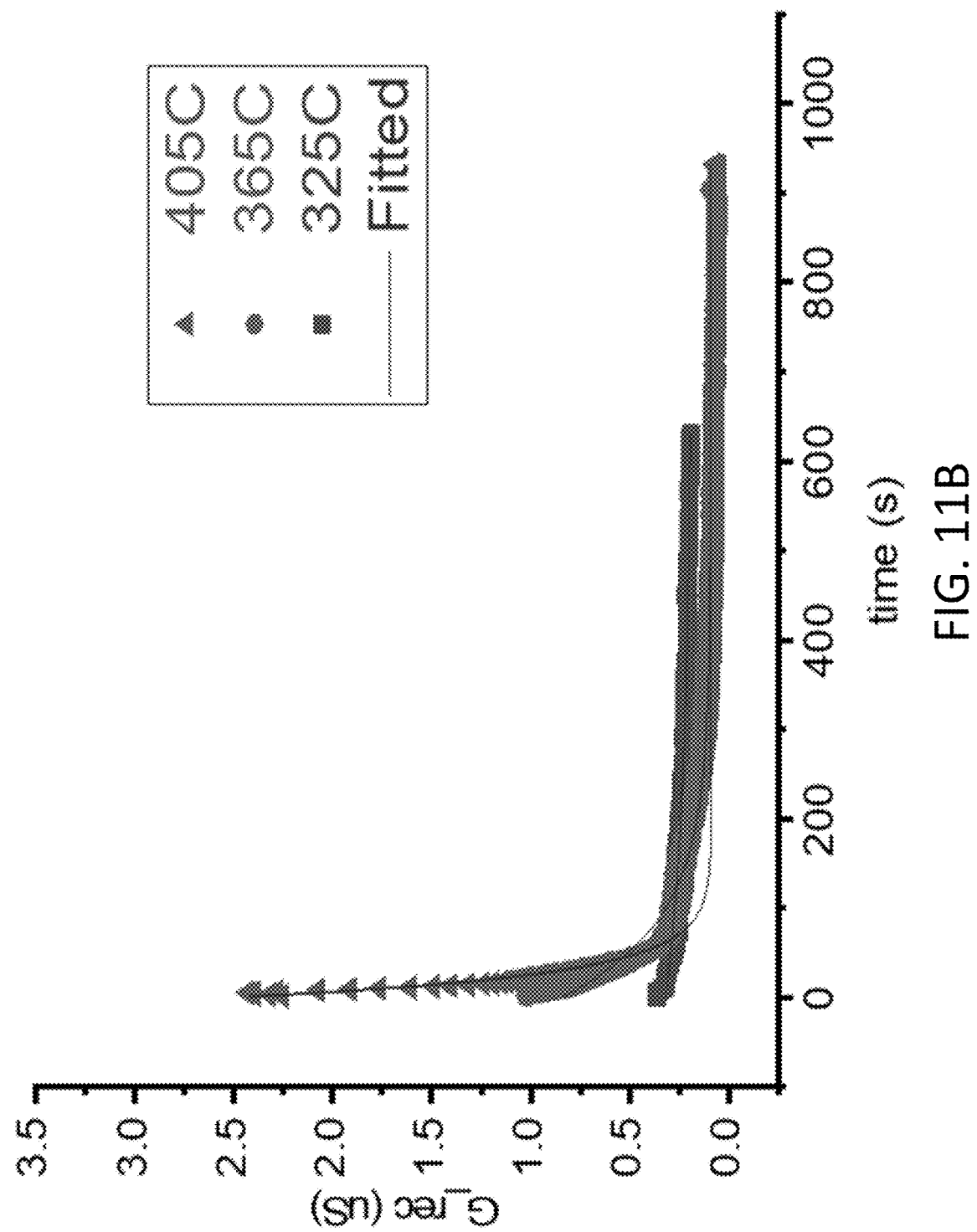

To calculate the previous constants, the raw transient resistance data were first converted to conductance versus time as shown in FIGS. 11A-11B. The response and recovery data were regressed respectively by Eq. 1 and Eq. 2 by MATLAB to obtain the three constants in each equation. The regressed values of the constants are listed in Table 3. FIGS. 11A and 11B show the experimental response and recovery conductance data, respectively, with the regressed curves using the model. A good fitting between the model and experimental data is evident from the comparison as well as high correlation coefficients (R2>0.95), Table 3). Such good agreement suggests that the p-xylene detection on the Au—ZnO sensor follows the mechanism of the single-site adsorption and desorption.

As shown in Table 3, both the response and recovery time constants, which are inversely proportional to the rate constant for adsorption of p-xylene and desorption of chemsorbed p-xylene, decrease with increasing temperature, because the rate constant always increases with temperature. Furthermore, the recovery constants are less than the response constants in the studied temperature range, indicating that desorption of the chemsorbed p-xylene is faster than adsorption of p-xylene. The base conductances $G_o$ and $G'_o$ decrease with increasing temperature in 325-405° C. The change of the conductance for the response and recovery steps, $\Delta G_1$ and $\Delta G'_1$, increases with temperature indicating a strong positive temperature dependence of the sensor sensitivity.

TABLE 3

Values of parameters for the response and recovery kinetics for Au—ZnO sensor with gas stream switched between pure air and air containing p-xylene.

| Temperature (° C.) | $t_{res}$ (s) | $G_o$ (μS) | $\Delta G_1$ (μS) | $R^2$ | $t_{rec}$ (s) | $G_o'$ (μS) | $\Delta G_1'$ (μS) | $R^2$ |
|---|---|---|---|---|---|---|---|---|
| 325 | 267.26 | 0.144 | 0.268 | 0.99 | 231.25 | 0.186 | 0.132 | 0.87 |
| 365 | 198.22 | 0.042 | 1.170 | 0.99 | 83.19 | 0.092 | 0.752 | 0.95 |
| 405 | 165.20 | 0.020 | 3.587 | 0.99 | 26.17 | 0.088 | 2.41 | 0.97 |

Figure 12:
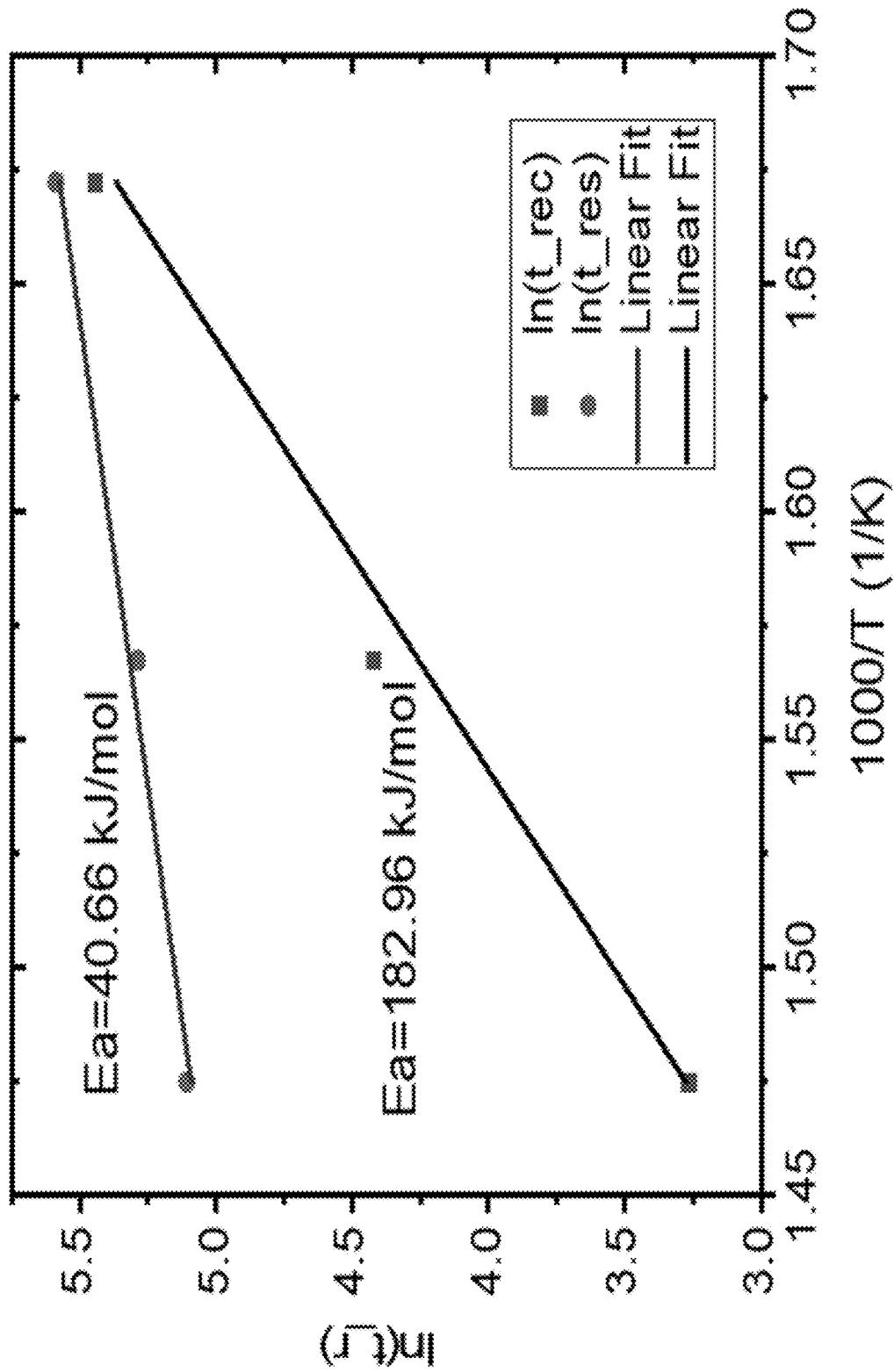
FIG. 12 shows the linear correlation of the characteristic time constants of the sensor response and recovery steps as function of 1000/T.

The Arrhenius-type plots of time constants ($t_r$) shown in FIG. 12 give activation energy of 40.66 kJ/mol and 182.96 kJ/mol respectively for the response and recovery steps. The activation energy for p-xylene adsorption on pristine ZnO surface has been estimated to be about 130 kJ/mol. Results suggest that the energy barrier for p-xylene adsorption is only 40.66 kJ/mol. Such difference can be attributed to the catalytic effect of Au nanoparticle that promotes adsorption through the spillover mechanism described herein. Overall, a reduced activation energy for adsorption of p-xylene on nanostructured Au—ZnO is confirmed. The activation energy for the recovery process comprises the steps of the desorption of products and the ionosorption of oxygen on Au—ZnO surface. The calculated effective energy barrier for the recovery process was 182.96 kJ/mol.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A sensing film comprising:
   a metal oxide film, wherein the metal oxide film is a monolayer comprising a plurality of metal oxide nanostructures; and
   noble metal nanoparticles disposed on the metal oxide film, wherein the sensing film is configured to detect an analyte gas,
   wherein the plurality of metal oxide nanostructures comprise aligned zinc (II) oxide nanowires arranged as a single nanowire thick layer, the zinc (II) oxide nanowires having a hexagonal wurtzite crystal structure and a width in a range of about 10 nm to about 30 nm, and a surface of the sensing film comprises periodic V-shaped grooves defined by surfaces of adjacent nanowires in the single nanowire thick layer.

2. The sensing film of claim 1, wherein the sensing film is configured to detect the analyte gas at a part-per-billion concentration.

3. The film of claim 1, wherein noble metal nanoparticles comprise gold.

4. The film of claim 1, wherein the sensing film is configured to detect the analyte gas in hydrogen gas, carbon monoxide, methane, ethane, ethene, acetylene, or a combination thereof.

5. The film of claim 4, wherein the analyte gas is a volatile organic compound.

6. The film of claim 5, wherein the volatile organic compound comprises ethanol, acetone, formaldehyde, or xylene isomers.

7. The film of claim 4, wherein the analyte gas is hydrogen sulfide.

8. The film of claim 1, wherein the V-shaped grooves stabilize the noble metal nanoparticles.

9. The film of claim 1, wherein the metal oxide film is a compressed Langmuir-Blodgett film.

10. The film of claim 1, wherein a thickness of the film is in a range of about 10 nm to about 30 nm.

11. The film of claim 1, wherein each V-shaped groove is defined by two adjacent zinc (II) oxide nanowires of the single nanowire thick layer.

12. A sensing film comprising:
   a metal oxide film, wherein the metal oxide film is a monolayer comprising a plurality of metal oxide nanostructures, and the metal oxide film is formed by compressed Langmuir-Blodgett assembly; and
   noble metal nanoparticles disposed on the metal oxide film, wherein the sensing film is configured to detect an analyte gas,
   wherein the plurality of metal oxide nanostructures comprise aligned zinc (II) oxide nanowires arranged as a single nanowire thick layer, the zinc (II) oxide nanowires having a hexagonal wurtzite crystal structure and a width in a range of about 10 nm to about 30 nm, and a surface of the sensing film comprises periodic V-shaped grooves defined by surfaces of adjacent nanowires in the single nanowire thick layer.

13. The film of claim 12, wherein each V-shaped groove is defined by two adjacent zinc (II) oxide nanowires of the single nanowire thick layer.

* * * * *